United States Patent
Withrow et al.

(10) Patent No.: US 11,321,964 B2
(45) Date of Patent: May 3, 2022

(54) LOOP CHAIN DIGITAL FINGERPRINT METHOD AND SYSTEM

(71) Applicant: ALITHEON, INC., Bellevue, WA (US)

(72) Inventors: Justin Lynn Withrow, Bellevue, WA (US); David Justin Ross, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 9 days.

(21) Appl. No.: 16/872,202

(22) Filed: May 11, 2020

(65) Prior Publication Data

US 2020/0356772 A1 Nov. 12, 2020

Related U.S. Application Data

(60) Provisional application No. 62/846,480, filed on May 10, 2019.

(51) Int. Cl.
*G06V 40/18* (2022.01)
*G06Q 30/06* (2012.01)
(Continued)

(52) U.S. Cl.
CPC ....... *G06V 40/197* (2022.01); *G06Q 30/0645* (2013.01); *G06V 40/172* (2022.01); *G06V 20/95* (2022.01)

(58) Field of Classification Search
CPC .......... G06K 9/00617; G06K 9/00288; G06K 2009/0059; G06Q 30/0645
See application file for complete search history.

(56) References Cited

U.S. PATENT DOCUMENTS 4,218,674 A  8/1980  Broscow et al.
4,423,415 A  12/1983  Goldman
(Continued)

FOREIGN PATENT DOCUMENTS

DE  102006005927 A1  8/2007
EP  0439669 A2  8/1991
(Continued)

OTHER PUBLICATIONS

Farid, "Digital Image Forensics," Dartmouth CS 89/189, Sprint 2013, 199 pages.
(Continued)

*Primary Examiner* — Ruiping Li
(74) *Attorney, Agent, or Firm* — Cozen O'Connor

(57) ABSTRACT

Methods, devices, and systems enable an originating entity to use a digital fingerprint, alone or in conjunction with other data related to the physical object, to characterize the physical object so that the physical object may be confirmed as authentic when it is returned to the originating entity or another entity. A determination that expected changes to the object occurred, and/or that unexpected changes did not occur, while the physical object was outside the control of the originating entity can be made. The originating entity may induct the object into a repository before the physical object leaves the originating entity's control, and the originating entity may authenticate the physical object upon return by a process that queries the repository for matching records.

20 Claims, 5 Drawing Sheets

(51) Int. Cl.
  *G06V 40/16* (2022.01)
  *G06V 20/00* (2022.01)

(56) References Cited

U.S. PATENT DOCUMENTS

| | | |
|---|---|---|
| 4,677,435 A | 6/1987 | Causse D'Agraives et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,421,453 B1 | 7/2002 | Kanevsky et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,940,391 B1 | 9/2005 | Ishikura et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,162,125 B1 | 4/2012 | Csulits et al. |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 8,774,455 B2 | 7/2014 | Elmenhurst et al. |
| 8,856,881 B2 | 10/2014 | Mouleswaran et al. |
| 8,959,029 B2 | 2/2015 | Jones et al. |
| 9,031,329 B1 | 5/2015 | Farid et al. |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,614,302 B2 | 4/2020 | Withrow et al. |
| 10,621,594 B2 | 4/2020 | Land et al. |
| 10,740,767 B2 | 8/2020 | Withrow |
| 10,936,838 B1 | 3/2021 | Wong |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |

(56) References Cited

U.S. PATENT DOCUMENTS

| | | |
|---|---|---|
| 2005/0119786 A1 | 6/2005 | Kadaba |
| 2005/0125360 A1 | 6/2005 | Tidwell et al. |
| 2005/0131576 A1 | 6/2005 | De Leo et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0043169 A1 | 3/2006 | Haertel |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0036470 A1 | 2/2007 | Piersol et al. |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0223791 A1 | 9/2007 | Shinzaki |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0005578 A1 | 1/2008 | Shafir |
| 2008/0008377 A1 | 1/2008 | Andel et al. |
| 2008/0011841 A1 | 1/2008 | Self et al. |
| 2008/0013804 A1 | 1/2008 | Moon et al. |
| 2008/0016355 A1 | 1/2008 | Beun et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0283583 A1 | 11/2009 | Cowburn et al. |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0049235 A1 | 3/2011 | Gerigk et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0011119 A1 | 1/2012 | Baheti et al. |
| 2012/0042171 A1 | 2/2012 | White et al. |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Dayer et al. |
| 2012/0250945 A1 | 10/2012 | Peng et al. |
| 2013/0110719 A1 | 5/2013 | Carter et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0201094 A1 | 7/2014 | Herrington et al. |
| 2014/0184843 A1 | 9/2014 | Campbell et al. |
| 2014/0270341 A1 | 9/2014 | Elmenhurst et al. |
| 2014/0314283 A1 | 10/2014 | Harding |
| 2014/0355890 A1 | 12/2014 | Highley |
| 2014/0380446 A1 | 12/2014 | Niu et al. |
| 2015/0043023 A1 | 2/2015 | Ito |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0110364 A1 | 4/2015 | Niinuma et al. |
| 2015/0117701 A1 | 4/2015 | Ross et al. |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034913 A1 | 2/2016 | Zavarehi et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0072626 A1 | 3/2016 | Kouladjie |
| 2016/0117631 A1 | 4/2016 | McCloskey et al. |
| 2016/0162734 A1 | 6/2016 | Ross et al. |
| 2016/0180485 A1 | 6/2016 | Avila et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0076132 A1 | 3/2017 | Sezan et al. |
| 2017/0132458 A1 | 5/2017 | Short et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | Macintosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1* | 12/2017 | Withrow ............ G06Q 30/0185 |
| 2018/0000359 A1 | 1/2018 | Watanabe |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1* | 2/2018 | Ross .................... G06F 16/434 |
| 2018/0053312 A1 | 2/2018 | Ross et al. |
| 2018/0121643 A1 | 5/2018 | Talwerdi et al. |
| 2018/0129861 A1 | 5/2018 | Kim et al. |
| 2018/0144211 A1 | 5/2018 | Ross et al. |
| 2018/0174586 A1 | 6/2018 | Zamora Esquivel et al. |

(56) References Cited

U.S. PATENT DOCUMENTS

| | | |
|---|---|---|
| 2018/0218505 A1 | 8/2018 | Kim et al. |
| 2018/0293370 A1 | 10/2018 | Kim et al. |
| 2018/0315058 A1 | 11/2018 | Withrow et al. |
| 2018/0341766 A1 | 11/2018 | Anagnostopoulos |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |
| 2019/0266373 A1 | 8/2019 | Hirokawa |
| 2019/0279017 A1 | 9/2019 | Graham et al. |
| 2019/0287118 A1 | 9/2019 | Ross et al. |
| 2019/0342102 A1 | 11/2019 | Hao et al. |
| 2019/0354822 A1 | 11/2019 | Pic et al. |
| 2019/0362186 A1 | 11/2019 | Irshad et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |
| 2020/0334689 A1 | 10/2020 | Withrow |
| 2020/0349379 A1 | 11/2020 | Ross |
| 2020/0356751 A1 | 11/2020 | Matsuda et al. |
| 2020/0356772 A1 | 11/2020 | Withrow et al. |
| 2021/0375291 A1 | 12/2021 | Zeng et al. |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3267384 A1 | 1/2018 |
| EP | 3270342 A1 | 1/2018 |
| EP | 3435287 A2 | 1/2019 |
| EP | 3514715 A1 | 7/2019 |
| ES | 2467465 A2 | 6/2014 |
| GB | 2097979 A | 11/1982 |
| GB | 2446837 A | 8/2008 |
| GB | 2482127 | 1/2012 |
| JP | S61234481 A | 10/1986 |
| JP | H07192112 | 7/1995 |
| JP | 2005321935 A | 11/2005 |
| JP | 2007213148 A | 8/2007 |
| JP | 2008021082 A | 1/2008 |
| JP | 2010146158 A | 7/2010 |
| JP | 5278978 B2 | 5/2013 |
| KR | 20010016395 A | 3/2001 |
| KR | 20120009654 A | 2/2012 |
| WO | WO2005086616 A2 | 9/2005 |
| WO | WO2006038114 A1 | 4/2006 |
| WO | WO2007028799 A1 | 3/2007 |
| WO | WO2007031176 A1 | 3/2007 |
| WO | WO2007071788 A1 | 6/2007 |
| WO | WO2007090437 A1 | 8/2007 |
| WO | WO2007144598 A1 | 12/2007 |
| WO | WO2009030853 A1 | 3/2009 |
| WO | WO2009089126 A1 | 7/2009 |
| WO | WO2009115611 A2 | 9/2009 |
| WO | 2010018646 A1 | 2/2010 |
| WO | WO2010018464 A2 | 2/2010 |
| WO | WO2012145842 A1 | 11/2012 |
| WO | 2013051019 A1 | 4/2013 |
| WO | WO2013126221 A1 | 8/2013 |
| WO | WO2013173408 A1 | 11/2013 |
| WO | WO2015004434 A1 | 1/2015 |
| WO | 2016081755 A1 | 5/2016 |
| WO | WO2016081831 A1 | 5/2016 |

OTHER PUBLICATIONS

Huang et al., "A Novel Binarization Algorithm for Ballistic Imaging Systems," 3rd International Congress on Image and Signal Processing, Yantai, China, Oct. 16-18, 2010, pp. 1287-1291.

Huang et al., "An Online Ballistics Imaging System for Firearm Identification," 2nd International Conference on Signal Processing Systems, Dalian, China, Jul. 5-7, 2010, vol. 2, pp. 68-72.

Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.

United States Postal Service, "NCOALink® Systems," download date Jun. 23, 2010, 2 pages. URL=https://web.archive.org/web/20100724142456/http://www.usps.com/ncsc/addressservices/moveupdate/changeaddress.htm.

United States Postal Service Publication 28 "Postal Addressing Standards", dated Jul. 2008; text plus Appendix A only; 55 pages.

Boa et al., "Local Feature based Multiple Object Instance Identification using Scale and Rotation Invariant Implicit Shape Model," 12th Asian Conference on Computer Vision, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Di Paola et al., "An Autonomous Mobile Robotic System for Surveillance of Indoor Environments," International Journal of Advanced Robotic Systems 7(1): 19-26, 2010.

Fischler et al., "Random Sample Consensus: A Paradigm for Model Fitting with Applications to Image Analysis and Automated Cartography," Communication of the ACM 24(6); 381-395, 1981.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.

Matsumoto et al., "Nano-artifact metrics based on random collapse of resist," Scientific Reports 4:6142, 2014 (5 pages).

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).

Shields, "How To Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages.

Entrupy.com Website History, Wayback Machine; https://web.archive.org/web/20160330060808/https://www.entrupy.com/; Mar. 30, 2016 (Year: 2016), 5 pages.

Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.

Mistry et al., "Comparison of Feature Detection and Matching Approaches: SIFT and SURF," Global Research and Development Journal for Engineering, vol. 2, Issue 4, Mar. 2017, 8 pages.

(56) References Cited

OTHER PUBLICATIONS

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.
Cavoukian et al.; "Biometric Encryption: Technology for Strong Authentication, Security and Privacy, Office of the information and Privacy Commissioner, Toronto, Ontario, Canada," 2008, in WE, International Federation Iot Information Processing, vol. 261; Policies and Research in Identity Management; Eds. E. de Leeuw. Fischer-Hiibner, S. Tseng, J., Barking, J.: (Boston: Springer), pp. 57-77 (21 pages).
Extended European search report for European Application No. 21166869.4, dated Feb. 7, 2022, 9 pages.
Farid, Ahmed , et al., "Integrated fingerprint verification method using a composite signature-based watermarking technique", Optical Engineering, The Catholic University of America, (Year: 2007), 6 pages.
Hensler, J. , et al., "Hybrid Face Recognition Based on Real-time Multi-camera Stereo-Matching", ICIAP: International Conference on Image Analysis and Processing, 17th International Conference, Naples, Italy, Sep. 9-13, 2013, 10 pages.
Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.
Scott, Von Duhn , et al., "Three-View Surveillance Video Based Face Modeling For Recognition", Biometrics Symposium, 2007, IEEE, PI, Sep. 30, 2007, 6 pages XP031202430.
Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.
Zaeri, Naser , "Minutiae-based Fingerprint Extraction and Recognition, 2020 (year 2010)", 47 pages.
Alpvision: "Intrinsic Characteristics for Authentication", Authentication News, Sep. 2006, vol. 12, No. 9, 3 pages.
Banafshe Arbab-Zavar et al., "On guided model-based analysis for ear biometrics", Computer Vision and Image Understanding, Academic Press, US, vol. 115, No. 4, Nov. 24, 2010, pp. 487-502, XP028153838.
Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.
Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.
Communication pursuant to Article 94(3) EPC, dated Nov. 5, 2020, EP Application No. 19153141.7, 4 pages.
Communication Pursuant to Rule 164(1) EPC, dated Feb. 2, 2022, for European Application No. 17166901.3, 5pages.
Ebay, "eBay Launches Must-Have iPhone App RedLaser 3.0" https://www.ebayinc.com/stories/news/ebay-launches-musthave-iphon-app-redlaser30/, Nov. 18, 2011 (Year: 2011), 8 pages.
Entropy.com Website History, Wayback Machine: https://web.archive.org/web/20 I 60330060808/https://www.entrupy.com/; Mar. 30, 2016 (Year: 2016), 2 pages.
European Office Action, dated Nov. 12, 2020, for corresponding European Application No. 17173150.8, 43 pages.
European Search Report dated Mar. 15, 2021, for corresponding EP Application No. 20202445.1, 8 pages.
European Search Report, dated Feb. 25, 2021, for European Application No. 20202130.9, 9 pages.
Extended European Search Report Application No. 21153877.2, dated Jun. 15, 2021, 8 pages.
Extended European Search Report, dated Aug. 18, 2021, for European Application No. 21164207.9—17 pages.
Extended European Search Report, dated Aug. 18, 2021, for European Application No. 21164207.9, 13 pages.
Extended European Search Report, dated Aug. 19, 2021, for European Application No. 21164353.1, 9 pages.
Extended European Search Report, dated Jan. 3, 2018, for European Application No. 17186959.7, 11 pages.
Extended European Search Report, dated Jun. 18, 2021, for European Application No. 21153355.9, 8 pages.
Extended European Search Report, dated Nov. 10, 2021, for European Application No. 21179491.2-1207, 8 pages.
Extended European Search Report, dated Oct. 25, 2021, for European Application No. 21176644.9-1207, 11 pages.
Final Office Action Issued in U.S. Appl. No. 16/917,355, dated Oct. 1, 2021, 13 pages.
Non-Final Office Action Issued in U.S. Appl. No. 16/553,943, dated Sep. 1, 2021, 13 pages.
Non-Final Office Action Issued in U.S. Appl. No. 16/752,593 dated Dec. 3, 2021, 55 pages.
Non-Final Office Action Issued in U.S. Appl. No. 16/783,126, dated Oct. 28, 2021, 29 pages.
Non-Final Office Action Issued in U.S. Appl. No. 16/825,270 dated Jan. 20, 2022, 29 pages.
Non-Final Office Action Issued in U.S. Appl. No. 16/827,701, dated Aug. 17, 2021, 19 pages.
Non-Final Office Action Issued in U.S. Appl. No. 16/866,468, dated Sep. 9, 2021, 24 pages.
Non-Final Office Action Issued in U.S. Appl. No. 16/867,506, dated Nov. 8, 2021, 2021, 14 pages.
Non-Final Office Action Issued in U.S. Appl. No. 16/903,323 dated Jan. 25, 2022, 13 pages.
Non-Final Office Action Issued in U.S. Appl. No. 16/917,355, dated May 18, 2021, 26 pages.
Notice of Allowance dated Oct. 14, 2021, for Ritchey, "Object Change Detection and Measurement Using Digital Fingerprints," U.S. Appl. No. 17/189,470, 12 pages.
Notice of Allowance dated Oct. 7, 2021, for Ritchey, "Automated Authentication Region Localization and Capture," U.S. Appl. No. 16/866,468, 9 pages.
Online NCOALink® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.
Rublee et al., "ORB: an efficient alternative to SIFT or SURF" IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Schwabe Williamson & Wyatt, PC—Listing of Related Cases; dated Sep. 16, 2017; 2 pages.
Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.
Shi et al., "Smart Cameras: Fundamentals and Classification," Chapter 2, Belbachir (ed.), Smart Cameras, Springer, New York, New York, USA 2010, pp. 19-34.
Shields, "How To Shop Savvy With Red Laser," published online on Mar. 22, 2010; https ://i phone .appstomn .net/reviews/lifesty le/how-to-shop-savvy-with-redlaser /, downloaded Mar. 22, 2010, 8 pages).
Smith, "Fireball: A Forensic Ballistic Imaging System: Proceedings of the 31st Annual International Carnahan Conference on Security Technology," Canberra, Australia, Oct. 15-17, 1997, pp. 64-70.
Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.
United States Postal Service, "NCOALink Systems", http://www.usps.com/ncsc/addressservices/moveupdate/changeaddress.htm, website accessed Jun. 23, 2010, 2 pages.
United States Postal Service, "Postal Addressing Standards," Publication Jul. 28, 2008, 55 pages.

(56) References Cited

OTHER PUBLICATIONS

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Yuetian Xu et al., "Robust object recognition using a cascade of geometric consistency filters", Applied Imagery Pattern Recognition Workshop (AIPRW), 2009 IEEE, IEEE, Piscataway, NJ, USA, Oct. 14, 2009, pp. 1-8, XP031677352.

\* cited by examiner

LOOP CHAIN DIGITAL FINGERPRINT METHOD AND SYSTEM

PRIORITY CLAIM

This application is a non-provisional of, and claims priority pursuant to 35 U.S.C. § 119(e) (2012) to U.S. provisional application No. 62/846,480 filed May 10, 2019, hereby incorporated by reference as though fully set forth.

COPYRIGHT NOTICE

COPYRIGHT© 2011-2020 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d) (2017).

BACKGROUND

Technical Field

The present disclosure pertains to systems, methods, and apparatus to identify or authenticate physical objects and, more specifically, to leverage digital fingerprint scanning, processing, and repository (e.g., database) techniques to authenticate and/or evaluate physical objects released from possession or control of a first entity (i.e., an originating entity), provided to a second entity, and subsequently returned or presented to the first entity.

Description of the Related Art

Some aspects of technologies and related art that may be useful in understanding the present disclosure are described in the following publications, which are each incorporated herein by reference in their respective entirety:

U.S. patent application Ser. No. 15/862,556, which is also published U.S. Patent Publication No. 2018/0144211 A1 by Ross et al., which describes, among other things, a database for detecting counterfeit items using digital fingerprint records;

U.S. patent application Ser. No. 13/618,362, which is also U.S. Pat. No. 9,152,862 by Ross et al., which describes, among other things, embodiments of digital fingerprinting;

U.S. patent application Ser. No. 14/531,724, which is also U.S. Pat. No. 9,443,298 B2 by Ross et al., which describes, among other things, digital fingerprinting object authentication and anti-counterfeiting systems;

U.S. patent application Ser. No. 15/436,631, which is also U.S. Pat. No. 10,037,537 B2 by Withrow et al., which describes, among other things, personal history in track and trace systems; and U.S. patent application Ser. No. 15/436,616, which is also U.S. Pat. No. 10,346,852 by Ross et al., which describes, among other things, embodiments of preserving authentication under item change.

Many different approaches have been tried to uniquely identify and authenticate physical objects, including labelling and tagging strategies using serial numbers, bar codes, holographic labels, RFID tags, and hidden patterns using security inks or special fibers. All of these methods can be duplicated, and many add a substantial extra cost to the production of the goods sought to be protected. Moreover, physical labels and tags may be lost, modified, or stolen, and the physical marking of certain objects such as artwork, gemstones, and collector-grade coins may damage or destroy the value of the object.

A need remains for solutions that enable a proprietor or an originating entity (or its agent) of a physical object, especially a valuable object, to release the object from its possession or control to a second party, and subsequently, when the object is returned, recovered, or presented, be able to authenticate it as being the physical object earlier released, including in cases where expected changes to the object have occurred in the interim.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure in order to provide a basic understanding of some features and context. This summary is not intended to identify key/critical elements of the present disclosure or to delineate the scope of the disclosure. Its sole purpose is to present some concepts of the present disclosure in a simplified form as a prelude to the more detailed description that is presented later.

In a preferred embodiment, the devices, methods, and systems of this disclosure (i.e., the teachings of this disclosure) enable an originating entity, or third party on behalf of the originating entity, to use a digital fingerprint, alone or in conjunction with other data concerning or related to a physical object, to characterize the subject physical object in a way that the physical object may be confirmed as authentic when it is returned to the originating entity or to an entity linked to that originating entity. The teachings of the present disclosure have in view any system where a physical object leaves the control of one entity and may at some point be returned to that same entity. The object may be returned in its original form or an acceptably or intentionally altered form. In addition, or in the alternative, a different object that is returned may be falsely purported to be the original object.

For example, one embodiment may include, but is not limited to, a store selling an object such as a luxury handbag, which object might later be returned by the purchaser. Here, the store selling the object will want to confirm with an acceptable level of confidence that the object returned is the original object, and the store will also want to know if the object returned is not the original object. Along these lines, other embodiments may include manufacturers who send out one or more objects for modification that are expected to be received back in a modified form. In these additional cases, the manufacturer will want to confirm with an acceptable level of confidence when the original object is returned, and when a different object is returned. In at least some further cases, the manufacturer may also want to confirm with an acceptable level of confidence that when the modification includes adding parts to the original object (e.g., populating a circuit board with electronic parts), whether or not the added parts can also be authenticated.

In all the cases in view, the originating entity desires to authenticate, or reach an acceptable level of certainty, that the object received back is the same object, altered or not, that previously left the entity's control. Typically, the authentication includes that the originating entity induct the object into a repository before the object leaves the originating entity's control and further includes that the originating entity authenticate the object that is returned. Several non-limiting examples are given below.

In an embodiment, an originating entity has an object he wishes to hypothecate, lend, rent out, warehouse, bail, sell, or otherwise have leave his possession or control with the expectation that the object will or may later be returned. If or when the object is returned to him, he wants to reach a level of certainty that what he has received is the original object, whether or not the object has been altered.

Also in view in the teachings of this disclosure are embodiments in which an owner or possessor of a valuable object may have concerns regarding loss or theft of the object, and such person or entity wants to be able to prove than an object later recovered is the original valuable object. Here, an object may be deemed "valuable" by any acceptable measure; even if such a measure is determined and held, exclusively or non-exclusively, by the owner or possessor of the object, or by any other actual or desired possessor of the object, whether such determination of value is reasonable to others or not. Hence, the term, "loop," as used in the present disclosure, includes the physical object going out and returning to the same entity which had prior possession, at least in some cases, regardless of how many intermediate hands the object may pass through. In an embodiment, prior to the object leaving its control, the originating entity may digitally fingerprint the object. In this or another embodiment, the originating entity obtains access to a digital fingerprint of the object. The original physical object leaves the possession of the originating entity and, subsequently, an item purporting to be the original physical object is returned. The teachings of this disclosure give the originating entity the means to authenticate the item upon its return. The term, "chain," as used in the present disclosure includes, at least in some cases, zero, one, two, or any number of authentications along the path of travel of the physical object from the originating entity, to any number of intermediate entities, and back to the originating entity or another entity designated by the originating entity.

In a preferred embodiment, a physical object is scanned and a digital image of the object is created from the scan. A subset of the image known as an "authentication region" may be selected. A set of features may be extracted from the authentication region, which set is sufficient to create a unique identifier or "digital fingerprint" for the object. The digital fingerprint may be registered in a database or some other repository.

To select locations in an image to extract fingerprint features, a software process may automatically select a large number of locations of interest. In some cases, hundreds or even thousands of locations of interest per square millimeter (mm) of preferred areas of interest are selected for purposes of generating a digital fingerprint. A location may be of interest because of a relatively high level of content. As the term is used in the present disclosure, "content," may in at least some cases include a gradient or vector, including a change in value and a direction.

In one embodiment, each such area of interest may be identified as a circle, for example, by a centroid location and radius. Within each circular area of interest, the software extracts one or more fingerprint features that define the relevant shapes within the corresponding circular location of the image. Each fingerprint feature may preferably be stored as a feature vector as described in the present disclosure. A feature vector in some cases is an array of integer or floating-point values describing an individual shape. Multiple feature vectors may be collected to form a digital fingerprint.

In a preferred embodiment, when a physical object is to be authenticated, a suitable system compares a digital fingerprint of the object to digital fingerprints previously stored in a repository such as a database and, based on that comparison, determines whether the object has been registered before, and may thus be considered to be authentic. The digital fingerprint data preferably specifies a set of features. In some embodiments, a template, which may be described as an "object feature template" or "fingerprint template," may be created. Such a template may include a list of certain features and attributes that are relevant for authenticating a particular class of objects. A template may identify locations or characteristics of particular features. One advantage of feature-based methods of authentication is that when the object is very worn from handling or use, an authentication system of the type employed in embodiments of the present disclosure may still identify the object as original, which is an outcome that is currently impossible to attain with conventional approaches such as the bitmapped approach.

A method may be summarized as including providing a database system having a processor and a data store; in the database system, designating an originating entity that is permitted to access and use the database system; in the database system, storing in the data store, in association with the originating entity, a first digital fingerprint of a first physical object, wherein the first digital fingerprint includes: (a) characterization data of physical characteristics of the first physical object to uniquely identify the first physical object, and (b) a first component digital fingerprint of at least one selected component of the first physical object to uniquely identify the at least one selected component; in the database system, at a time subsequent to said storing the first digital fingerprint in the data store, receiving a target digital fingerprint, wherein the target digital fingerprint includes: (a) characterization data of physical characteristics of a target physical object to uniquely identify the target physical object, and (b) a target component digital fingerprint of at least one component of the target physical object to uniquely identify the at least one component of the target physical object; in the database system, querying the data store based on the target digital fingerprint; in the database system, if the querying identifies a stored digital fingerprint record having a stored digital fingerprint that matches the target digital fingerprint within a predetermined similarity threshold, generating an output that indicates the target physical object is the first physical object; in the database system, comparing a first component digital fingerprint of the stored digital fingerprint record to the target component digital fingerprint; and generating a report based on the comparing.

Generating the report may include identifying a component of the target physical object that does not match a corresponding component of the first physical object; and indicating that the corresponding component of the first physical object was removed, altered, or replaced between a first time when the first digital fingerprint was acquired and a second time, after the first time, when the target digital fingerprint was acquired.

The method may further include determining an elapsed time between the first time and the second time; and adjusting the predetermined similarity threshold based on the elapsed time to accommodate wear and tear of the first physical object between the first time and the second time.

The method may further include storing data defining a testing protocol in the data store, the testing protocol linked to the first digital fingerprint, the testing protocol defining at least one element of the characterization data of physical characteristics of the first physical object that is expected to have changed between the first time and second time; and based on the testing protocol, excluding from the comparing the at least one element of the characterization data of physical characteristics of the first physical object that is expected to have changed between the first time and second time. Generating the report may include identifying a component of the target physical object that matches a corresponding component of the first physical object; and indicating that the corresponding component of the first physical object was not removed, not altered, or not replaced from the first physical object between a first time when the first digital fingerprint was acquired and a second time, after the first time, when the target digital fingerprint was acquired. The characterization data of physical characteristics of the first digital fingerprint may be responsive to a natural structure of the first physical object and may include at least a first feature vector, wherein the first feature vector may include a plurality of values responsive to a specific feature or region of interest of the first physical object.

The method may further include storing data defining a testing protocol in the data store, the testing protocol linked to the first digital fingerprint, the testing protocol defining at least one element of the characterization data of physical characteristics of the first digital fingerprint that must be matched by the characterization data of physical characteristics of the target digital fingerprint to generate the output that indicates that the target physical object is the first physical object, the testing protocol further defining a first component of the first physical object that is expected to be replaced and a second component of the first physical object that is not expected to be replaced; and comparing digital fingerprints of the first and second components of the first physical object to corresponding digital fingerprints of the target physical object in accordance with the stored testing protocol. The first physical object may be an electronic system, a mechanical system, or an electromechanical system, and wherein the at least one element defined by the testing protocol may include a combination of pieces of the target physical object. The characterization data of physical characteristics of the first physical object may include at least one set of features, the at least one set of features including at least one of surface texture, x-ray image data, shape data, color data, dimension data, and weight data.

A method may be summarized as including selecting an object; while the selected object is under control of a proprietor, capturing sensor data of the selected object; generating from the sensor data of the selected object a digital fingerprint, wherein the digital fingerprint includes characterization data of the selected object, the digital fingerprint arranged to uniquely identify the selected object; providing a database system, the database system having a processor and a data store; storing the digital fingerprint in the data store; after the selected object has been out of control of the proprietor for a determined time period, receiving a target object that is possibly the selected object; capturing sensor data of the target object; generating from the sensor data of the target object a target digital fingerprint; querying the database system, based on the target digital fingerprint, to authenticate the target object as the selected object; and generating a message based on a result of the querying.

The method may further include creating a unique identifier for the selected object while the selected object is under the control of the proprietor, wherein the unique identifier includes a digital model based on physical characteristics of the selected object, said physical characteristics including at least one of surface texture, x-ray image data, shape data, color data, dimension data, and weight data.

The method may further include creating related data associated with the digital model, the related data including data identifying a shipping container of the selected object; and storing the related data in the database system.

The method may further include storing at least one of certificate data, provenance data, most recent authentication data, and transaction history data in association with the digital fingerprint in the database system. The digital model may include information about at least one of packaging, an affixed identifier, a warranty, a certificate, a condition of manufacture, and a guarantee.

The method may further include generating a model digital fingerprint from the digital model. Generating the digital fingerprint may include acquiring scan data of packaging, at least one tag, a certificate, a seal, or at least one affixed structure of the selected object; and detecting, based on a digital fingerprint generated from the scan data, that at least one component of the selected object has been substituted. The scan data may include digital image data captured by a scanner, a camera, or a specially adapted sensor or sensor array. Acquiring the scan data may include capturing the scan data by one of a set of sensors that includes: a microscope, a smartphone camera, a video camera, an x-ray machine, a sonar, an ultrasound machine, and a microphone.

A non-transitory computer-readable storage medium whose stored contents configure a computing system to perform a method may be summarized as including capturing sensor data of a selected physical object while the selected object is under control of a proprietor; generating a digital fingerprint from the sensor data, the digital fingerprint uniquely identifying the selected object; storing the digital fingerprint in a data store of a database system; at a time subsequent to when the selected object was under control of the proprietor, capturing target sensor data of a target object; generating a target digital fingerprint from the target sensor data; querying the database system, based on the target digital fingerprint, to authenticate the target object as the selected object; and generating a message based on a result of the querying.

The method may further include identifying a component of the target object that does not match a corresponding component of the selected object; and indicating in the message that the corresponding component of the selected object was removed, altered, or replaced between a first time when the digital fingerprint was generated acquired and a second time, after the first time, when the target digital fingerprint was generated.

Additional aspects and advantages of the present disclosure will be apparent from the following detailed description of preferred embodiments, which proceeds with reference to the accompanying drawings.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

In order to describe the manner in which the above-recited and other advantages and features of the disclosure can be obtained, a more particular description follows by reference to the specific embodiments thereof which are illustrated in the appended drawings. Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings.

Understanding that these drawings depict only some embodiments of the present disclosure and are not therefore to be considered to be limiting of its scope, the present disclosure will be described and explained with additional specificity and detail through the use of the accompanying drawings in which.

DETAILED DESCRIPTION

Figure 1:
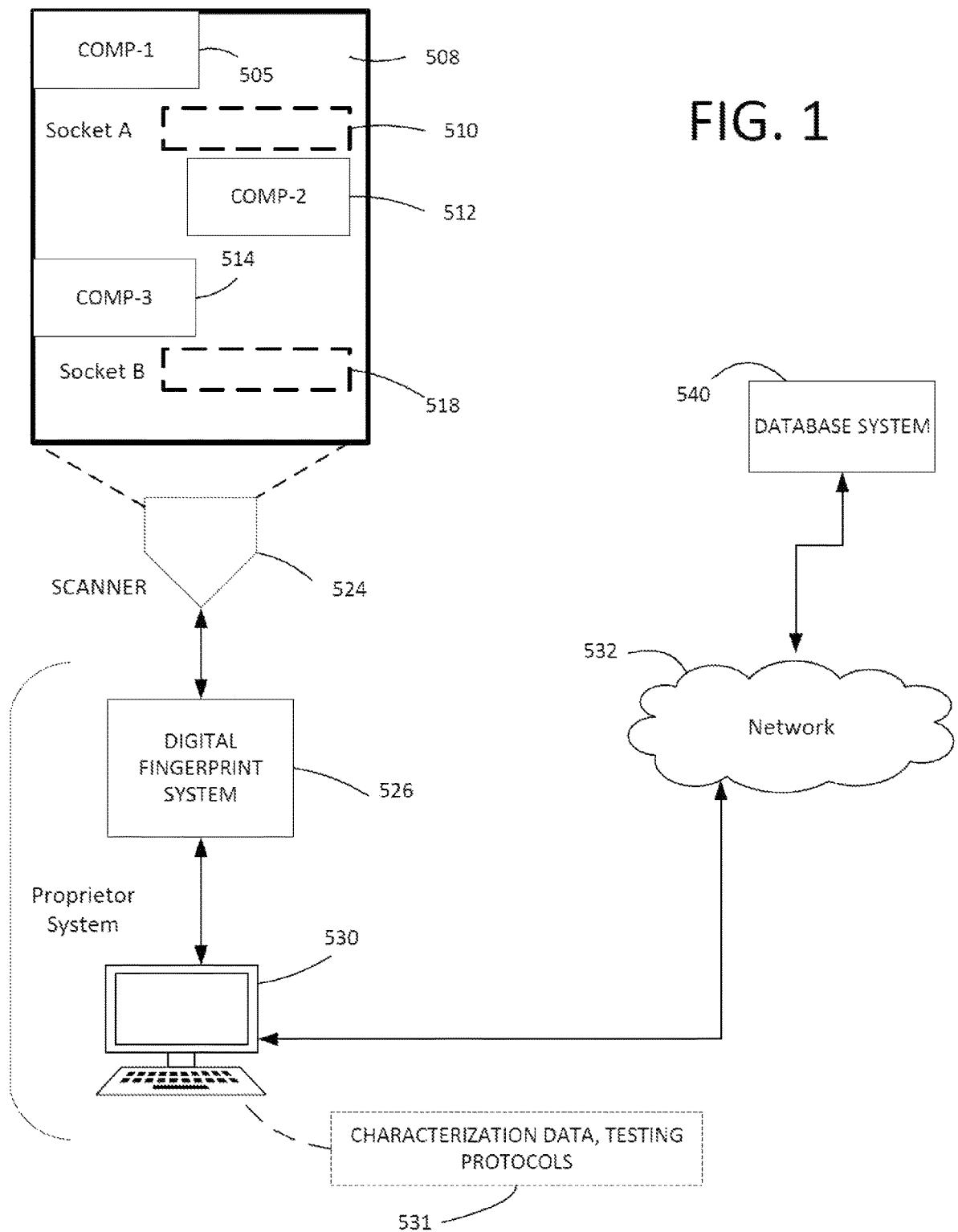
FIG. 1 is a schematic of a system and method for inducting an object and components of the object into a digital fingerprint repository.

The device, method, and system embodiments described in this disclosure (i.e., the teachings of this disclosure) enable an originating entity to generate or otherwise acquire at least one digital fingerprint of an object and then give up control of the object with confidence that the exact same object can be later identified to an acceptable level of certainty.

The term "digital fingerprint" in all its grammatical forms and constructs, is used throughout the present specification and claims to refer to a computationally unique digital identifier of a physical object or a portion of a physical object. To the limitations of the available computational resources, each and every digital fingerprint identifying a determined portion of a physical object is different from each and every other digital fingerprint identifying a different physical object or identifying a different portion of the same physical object. And to the limitations of the available computational resources and the preservation of the determined portion of the physical object on which a first digital fingerprint is generated, each and every subsequent digital fingerprint identifying the same determined portion of the same physical object is statistically the same as the first digital fingerprint. In at least some cases, a digital fingerprint, as the term is used herein, is generated in a method that includes acquiring a digital image, finding points of interest within that digital image (e.g., generally, regions of disparity where "something" is happening, such as a white dot on a black background or the inverse), and characterizing those points of interest into one or more feature vectors extracted from the digital image. Characterizing the points of interest may include assigning image values, assigning or otherwise determining a plurality of gradients across the image region, or performing some other technique. The extracted feature vectors may or may not be analyzed or further processed. Instead, or in addition, the extracted feature vectors that characterize the points of interest in a region may be aggregated, alone or with other information (e.g., with location information) to form a digital fingerprint.

In embodiments of the present disclosure, digital fingerprinting includes the creation and use of digital fingerprints derived from properties of a physical object. The digital fingerprints are typically stored in a repository such as a register, a physical memory, an array, a database, data store, or some other repository. Storing the digital fingerprint in the repository may include, or in some cases be referred to as, inducting the respective physical object into the repository. Digital fingerprints, whether immediately generated or acquired from a repository, may be used to reliably and unambiguously identify or authenticate corresponding physical objects to an acceptable level of certainty, track the physical objects through supply chains, and record their provenance and changes over time. Many other uses of digital fingerprints are of course contemplated.

Digital fingerprints store information, preferably in the form of numbers or "feature vectors," that describes features that appear at particular locations, called points of interest, of a two-dimensional (2-D) or three-dimensional (3-D) object. In the case of a 2-D object, the points of interest are preferably on a surface of the corresponding object; in the 3-D case, the points of interest may be on the surface or in the interior of the object. In some applications, an object "feature template" may be used to define locations or regions of interest for a class of objects. The digital fingerprints may be derived or generated from digital data of the physical object which may be, for example, image data.

While the data from which digital fingerprints are derived is often images, a digital fingerprint may contain digital representations of any data derived from or associated with the object. For example, digital fingerprint data may be derived from an audio file. That audio file in turn may be associated or linked in a repository (e.g., a database, data store, memory, or the like) to an object. Thus, in general, a digital fingerprint may be derived from a first object directly, or it may be derived from a different object (e.g., a file) linked to the first object, or a combination of two or more sources. In the audio example, the audio file may be a recording of a person speaking a particular phrase. The digital fingerprint of the audio recording may be stored as part of a digital fingerprint of the person speaking. The digital fingerprint (e.g., the digital fingerprint of the person) may be used as part of a system and method to later identify or authenticate that person, based on their speaking the same phrase, in combination with other sources.

Returning to the 2-D and 3-D object examples discussed herein, feature extraction or feature detection may be used to characterize points of interest. In an embodiment, this may be done in various ways. Two examples include Scale- Invariant Feature Transform (or SIFT) and Speeded Up Robust features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB, etc. SIFT and SURF are most useful approaches to detect and matching of features because of it is invariant to scale, rotate, translation, illumination, and blur." MISTRY, Darshana et al., *Comparison of Feature Detection and Matching Approaches: SIFT and SURF*, GRD Journals—Global Research and Development Journal for Engineering|Volume 2|Issue 4|March 2017.

In an embodiment, features may be used to represent information derived from a digital image in a machine-readable and useful way. Features may comprise point, line, edges, blob of an image, etc. There are areas such as image registration, object tracking, and object retrieval, etc., that require a system or processor to detect and match correct features. Therefore, it may be desirable to find features in ways that are invariant to rotation, scale, translation, illumination, and/or noisy and blurred images. The search of interest points from one object image to corresponding images can be very challenging work. The search may preferably be done such that the same physical interest points may be found in different views. Once located, points of interest and their respective characteristics may be aggregated to form a digital fingerprint, which may include 2-D or 3-D location parameters.

In an embodiment, features may be matched, for example, based on finding a minimum threshold distance. Distances can be found using Euclidean distance, Manhattan distance, or other suitable metrics. If distances of two points are less than a prescribed minimum threshold distance, those key points may be known as matching pairs. Matching a digital fingerprint may comprise assessing a number of matching pairs, their locations, distance, or other characteristics. Many points may be assessed to calculate a likelihood of a match, since, generally, or at least in some cases, a perfect match will not be found. In these cases where a perfect match is not found, a match may still be asserted when the features are matched to within a predetermined similarity threshold or some other acceptable level of confidence. In some applications a "feature template" may be used to define locations or regions of interest for a class of physical objects.

The term, "induction," as used in the present disclosure, refers to acts that include generating and storing, or otherwise acquiring access to, at least one digital fingerprint of a physical object, and storing the one or more digital fingerprints in a repository. Each stored digital fingerprint may be communicatively linked (i.e., associated) with other information related to the physical object. Hence, induction may also include acts that store additional information related to the physical object in a same or different repository. The additional information may be stored in association with any number of digital fingerprints. The association may include storing associated data in a common or shared repository record, communicatively linking one or more repository records together, or via other techniques known in the art to link information. For the sake of illustration and not limitation, induction may include storing one or more digital fingerprints in a new or existing repository record and further storing some other type of information, whether related to one or both of the physical object and the digital fingerprint, in a same or linked repository record.

Scanning

In the present disclosure, the term, "scan," in all of its grammatical forms, refers illustratively and without limitation to any and all means for capturing scan data, including an image or set of images, which may be in digital form or transformed into digital form. Images may, for example, be two dimensional (2-D), three dimensional (3-D), or in the form of video. Thus, a scan may refer to a collection of scan data, including one or more images, or digital data that defines such an image or images, captured by a scanner, a camera, an imager, a 3D-sense device, a LiDAR-based device, a laser-based device, a specially adapted sensor or sensor array (e.g., a CCD array), a microscope, a smartphone camera, a video camera, an x-ray machine, a sonar, an ultrasound machine, a microphone (i.e., any instrument for converting sound waves into electrical energy variations), and the like. Broadly, any device that can sense and capture either electromagnetic radiation or a mechanical wave that has traveled through an object or reflected off an object, or any other means to capture surface or internal structure of an object, is a candidate to create a scan of an object. Various means to extract features from an object may be used. For example, features may be extracted through sound, physical structure, chemical composition, or many other means. Accordingly, while the term, images, and cognates of the term, images, are used to form the digital fingerprints described herein, the broader application of scanning technology will be understood by those of skill in the art. In other words, alternative means to extract features from an object and to generate a digital fingerprint that uniquely identifies the object should be considered equivalents within the scope of this disclosure. Along these lines, terms such as "scanner," "scanning equipment," "sensor," "sensor array," and the like as used herein may be understood in a broad sense to refer to any equipment capable of carrying out scans as described above, or to equipment that carries out scans as described above, as part of their function to produce sensor data (e.g., scan data, image data, x-ray data, acoustic data, ultrasound data, audio data, or the like).

Authentication

In this application, different forms of the words "authenticate" and "authentication" will be used broadly to describe both authentication and attempts to authenticate, which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a repository (e.g., a database, a data store, or the like) for subsequent reference, this action too may be described as "authentication" or "attempted authentication," and this action may also, post facto, be properly described as an induction. An authentication of an object may refer to the induction or authentication of an entire object or of a portion of an object.

Loop Chain System, Methods, and Devices

The present disclosure describes circumstances where a physical object that is in control of a first entity, subsequently becomes out of control of the first entity. In some cases, the physical object is returned to control of the first entity. In other cases, the physical object is returned or otherwise delivered into control of a second entity that has been designated by the first entity. In these cases, one or more entities would like to know with reasonable certainty that the physical object that left control (e.g., possession) of the first entity is the same physical object that was returned to the first entity or brought into control by the second entity. In at least some cases, the second entity has permission for such control from the first entity and may be in communication with the first entity. In this way, the present disclosure uses the term, "loop." A loop occurs when the physical object is in the possession of a first entity, leaves control of the first entity, and then returns to the control of the first entity or a second entity that has permission from the first entity to control the physical object. The term, loop, does not distinguish the passage of time, the number of entities that intermediately control the physical object, or even if the physical object is not in control of any entity.

In embodiments described herein, the first entity obtains access to at least one digital fingerprint of the physical object. The original physical object then leaves the possession of the first entity and, subsequently, an item purporting to be the original physical object is returned to the first entity or some other entity. The teachings of this disclosure give the first entity or any number of other entities the means to authenticate the physical object upon its return or at any interim point in the loop. In this way, the present disclosure uses the term, "chain," to include zero, one, two, or any number of authentications of the physical object along the loop of travel of the physical object from the first entity, to any number of intermediate entities, and back to the first entity or some other entity designated by the first entity.

In a preferred embodiment, each time an object leaves an originating entity's possession, the object may be subject to risk of substitution by similar goods of lesser value, or subject to other tampering such as component theft or unauthorized component addition or alteration. The devices, methods, and systems described herein may be used to mitigate, or at least in some cases eliminate these risks. As disclosed herein, the originating entity, and alternatively or additionally any other entities to the transactions involving the object, may obtain acceptably high-confidence confirmation (e.g., 75% confidence, 95% confidence, 99.999% confidence, or some other level of confidence) that the whole or any portion of the original object in the primary, or any subsequent transactions (e.g., a return of the object), is determined to be the same object or component as was digitally fingerprinted in the first instance.

In the present disclosure, the terms, "first entity," "originating entity," proprietor, and the like may be used interchangeably. For the sake of illustration and not limitation, the term, "originating entity," as used herein, is an entity that participates as a first entity in a loop chain of a physical object. As such, an originating entity may or may not be the first true creator, owner, or possessor of the physical object. Accordingly, the present disclosure also contemplates any number or combinations of staggered and/or nested loop chains. One such non-limiting nested loop chain includes a first originating entity inducting a certain physical object into a first repository, and then sending the certain physical object to a second entity. The second entity may begin a second loop chain by inducting the certain physical object into the same first repository or a second repository and sending the certain physical object to a third entity. In the second loop chain, the second entity is an originating entity to the second loop chain. The third entity, or some other entity, may subsequently deliver a returned object back to the second entity or the first entity. One or both of the second entity and first entity may close their respective loop chain after authenticating, to an acceptable level of certainty, that the returned object is the certain physical object that was sent out.

Throughout in this description the "originating entity" is further meant to include anyone or anything acting as an agent, operating on behalf of, or otherwise in authorized association with the originating entity. For the sake of example and not limitation, an originating entity, as the term is used expressly or interchangeably, may in some cases include one or more delegates or other third parties that perform certain acts. The certain acts may include, for example and not limitation, scanning, photographing, sensing, generating digital fingerprints, populating a repository, querying a repository, maintaining a repository, and other like acts to carry out the teachings of this disclosure. The originating entity, and at least some of the delegates and other third-party entities, may or may not own or operate the equipment that carries out the certain acts.

The entities described herein may be human beings acting alone or in concert with other entities. The entities described herein may be non-human entities. In preferred embodiments, the teachings of this disclosure allow the originating entity to reliably detect, avoid, sidestep, and/or document a variety of possible interferences with the anticipated transaction, such as co-mingling, substitution, fraud, unauthorized alteration, or theft of the digitally fingerprinted object. These interferences may be deliberate or inadvertent. Conversely, the system allows for the verification and documentation of the absence of such interference, which may be equally or more valuable to the originating entity.

In this disclosure, some examples are given in a vendor-buyer relationship, but examples are intended to cover any and all situations where possession, control, ownership, or other interest in a physical object is transacted, contemplated, or otherwise at issue between two or more entities and where there is a possibility or expectation of return of the physical object to an entity with a previous interest. The description "entity" is not limiting. For example, in some embodiments the two or more entities may consist of two separate actors within the same corporate entity or structure.

Contract Manufacturing Embodiment

In an embodiment, a manufacturer may send a physical object, such as a circuit board, to a contract manufacturer who adds components to the board and then returns the board. The original manufacturer may, using the teaching of this disclosure, know with an acceptable level of certainty that none of the original components (e.g., integrated circuits, discreet components, transceivers, or any other part of an electronics device or any other product that may be altered, modified, and or stolen) have been replaced with counterfeits. Thus, not only may the physical object circuit board itself pass the authentication to be received back, but at least some of the board's original components may also pass such authentication.

FIG. 1 is a system and method for inducting a physical object and components of the object into a digital fingerprint repository via a digital fingerprint system 526. In some cases, the digital fingerprint repository is arranged as a local database. In other cases, the digital fingerprint repository is arranged as a remote database system 540. The digital fingerprint repository includes a processor and a data store. The digital fingerprint repository, via the processor, may be interrogated, queried, loaded, updated, or otherwise interacted with using any acceptable protocol such as structured query language.

Digital records of the digital fingerprint repository are accessible via a computing system (e.g., a computing server 530 or other computing device), wherein information 531 (e.g., digital fingerprints, characterization data, testing protocol data, provenance data, authentication data, feature data, certificate data, most recent authentication data, transaction history data, and other such data), is passed via a network 532 (e.g., a local area network (LAN), a wide area network (WAN) such as the Internet, or some other network).

An induction process is illustrated in a simplified diagram. In this embodiment, a contract manufacturer or other proprietor may possess a circuit board or PCB 508. The PCB 508 may include installed components illustrated at 505, 512 and 514. For example, the installed components may be integrated circuits. The PCB 508 may also include locations or sockets (Socket A 510, Socket B 518) arranged to receive additional components. A scanner 524 may be arranged to scan portions of the PCB 508 to form digital fingerprints to identify or authenticate the board. The digital fingerprints may include the locations (i.e., sockets) 510, 518 where additional components are expected to be affixed. The component can be, in one example, a structure or item to be added to the original object after the digital fingerprint of the original object was first captured and stored. The digital fingerprint of the first object can be captured and stored again after one or more components are added. Further, scanner 524 may scan any or all of the installed components 505, 512, 514 to form individual digital fingerprints of those components. After this induction process, the PCB may be shipped out to a vendor for specific work to be done.

Figure 2:
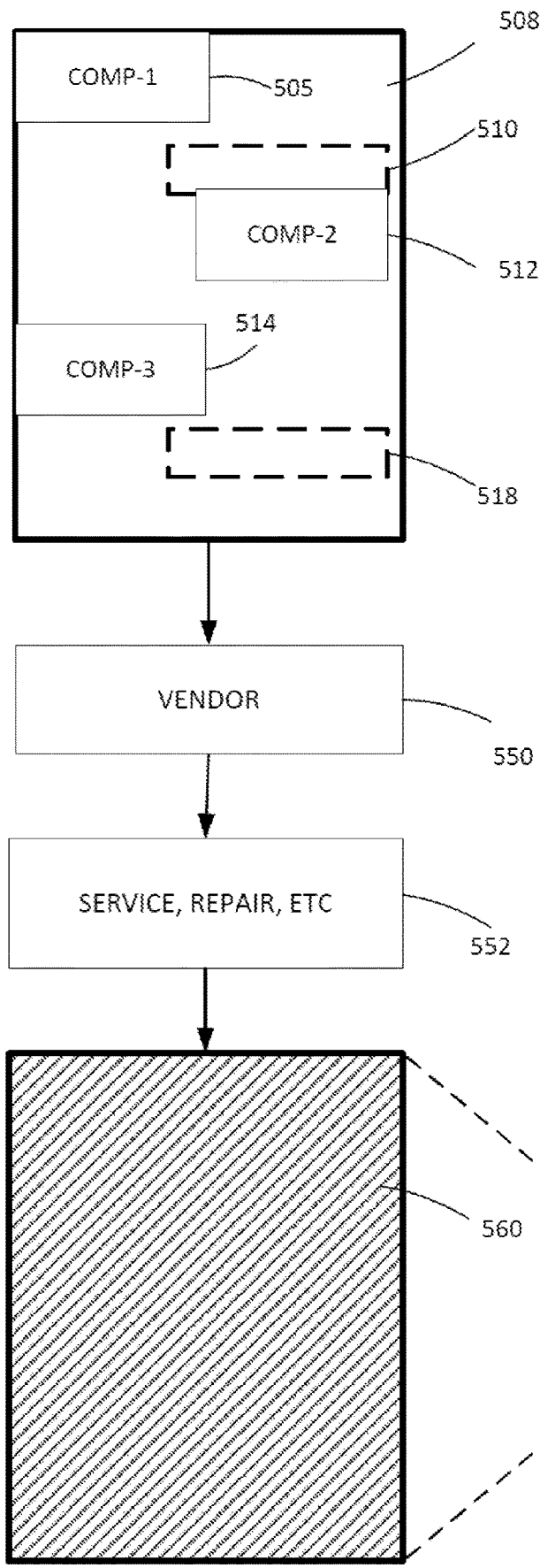
FIG. 2 is a schematic of a portion of a loop chain embodiment of a vendor receiving an object, modifying the object, and returning the modified object to the proprietor from which it came.

FIG. 2 is a portion of a loop chain embodiment of a vendor receiving an object, modifying the object, and returning the modified object to the proprietor from which it came. FIG. 2 illustrates the same PCB 508 delivered to a vendor 550 for processing, servicing or repair 552. After the PCB is returned, or a target PCB 560 that putatively is the original PCB 508, is tendered for return to the proprietor from the vendor 550, the digital fingerprint data earlier accessed can be used to obtain an acceptable degree of certainty (e.g., 75% certainty, 95% certainty, 99.999% certainty, or some other level of certainty) that none of the original components have been replaced with counterfeit components.

Along these lines, embodiments of the systems, devices, and methods (i.e., the teaching) of the present disclosure, may be applied to identify a component of any target physical object that does not match a corresponding component of the original or earlier controlled physical object when the components should match. If one part of the original object is authenticated, and another portion of the same physical object is not authenticated, then a selected indication can be asserted. The selected indication may be, for example, an indication that the corresponding component of the first physical object was improperly removed, altered, substituted, or replaced between a first time when a first digital fingerprint was acquired and a second time, after the first time, when a target digital fingerprint was acquired.

Conversely, the teaching of the present disclosure, may be applied to identify a component of any target physical object that matches a corresponding component of the original or earlier controlled physical object when the components should not match. If one part of the original object is authenticated, and another portion of the same physical object is authenticated when it should not be, then an appropriate indication can be asserted. The indication may, for example, be an indication that the corresponding component of the first physical object has not been removed, altered, substituted, or replaced between a first time when a first digital fingerprint was acquired and a second time, after the first time, when a target digital fingerprint was acquired even though the particular component should have been removed, altered, substituted, or replaced. This type of indication can be used to validate that maintenance or other work scheduled or otherwise directed for performance has actually been performed.

Figure 3:
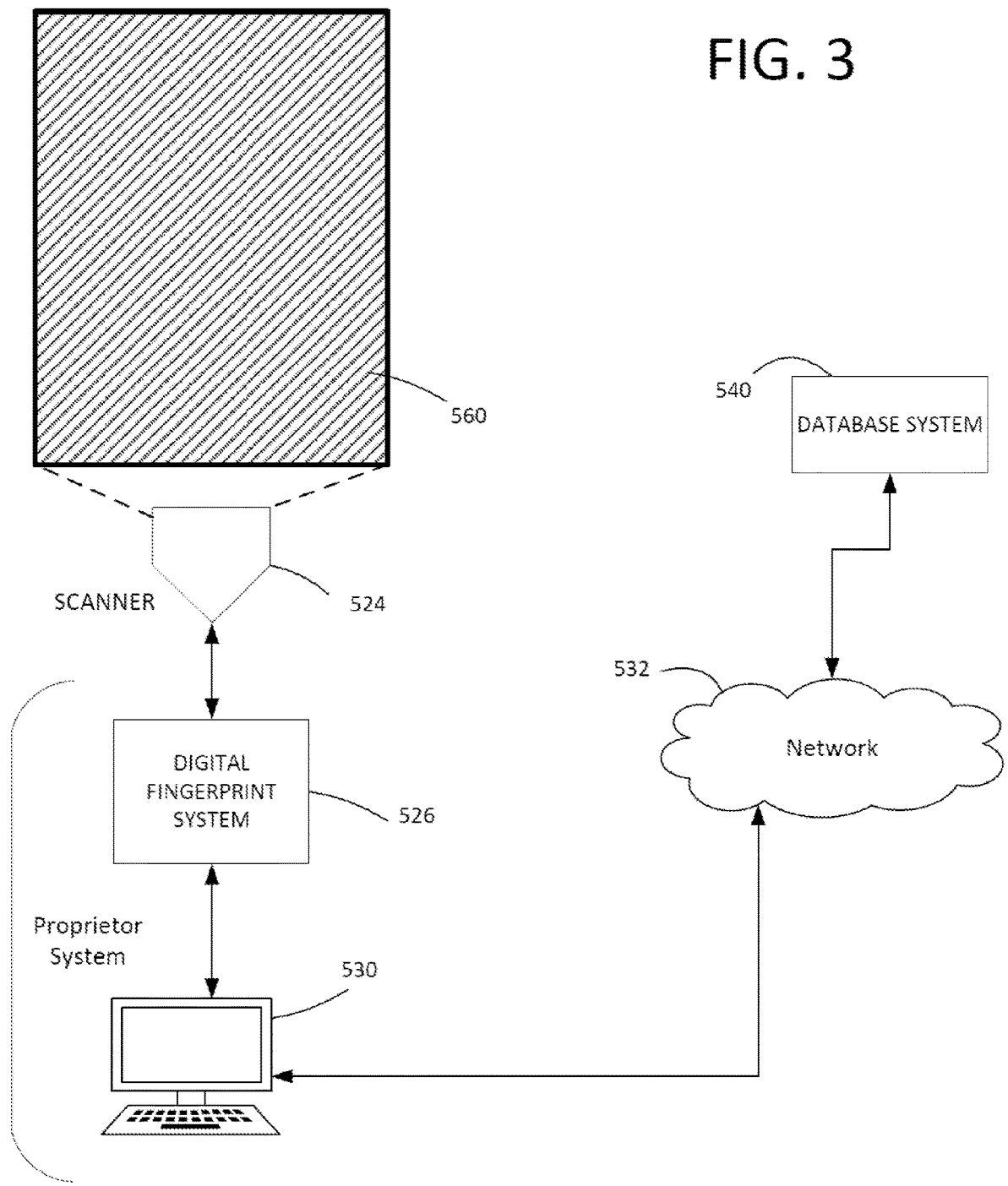
FIG. 3 is a schematic of a system and method for receiving a modified object, generating and storing at least one digital fingerprint of the object, and using one or more of the generated digital fingerprints to analyze the modified object relative to digital fingerprint records stored in a repository and associated with the original, unmodified object.

FIG. 3 is a system and method for receiving a modified object, generating and storing at least one digital fingerprint of the object, and using one or more of the generated digital fingerprints to analyze the modified object relative to digital fingerprint records stored in a repository and associated with the original, unmodified object. In at least some cases, the repository (e.g., a data store of database system 540) will store one or more testing protocols that define operations of a database system to acquire digital fingerprints, induct an object into the repository based on the acquired digital fingerprints, and then conduct further operations when the object is returned to control of a first entity after having been out of control of the first entity.

Data defining a testing protocol may be generated in some cases by a computing system (e.g., proprietor system 530, which may be a computing server or some other computing device). In other cases, the testing protocol and associated data are generated in another way. The computing system may then communicate any number of testing protocols to the remote database system 540 for storage in the data store. One or more testing protocols may be linked to one or more digital fingerprints. Accordingly, each object that is inducted into the system may be associated with any number of testing protocols.

In at least some cases, a testing protocol defines at least one element of characterization data of physical characteristics of its associated physical object. The characterization data can define one or more physical characteristics that are expected to have changed between a first time, when the object is in control of the entity, and a second time, when the object has been returned to control of the entity, after having been out of control of the entity during the first and second times. In some cases, based on the testing protocol, one or more elements of the characterization data of physical characteristics of the physical object that is expected to have changed between the first time and second time is excluded from the comparing. In these and other cases, based on the testing protocol, one or more elements of the characterization data of physical characteristics of the physical object that is expected to have changed between the first time and second time are expressly is included in the comparing. In these cases, a predetermined threshold of similarity or other determination of what constitutes an acceptable level of confidence may be manually or programmatically adjusts.

In at least one case, data defining a testing protocol is stored in the data store of database system 540 or some other repository. The testing protocol in this case is linked to a first digital fingerprint of a particular physical object of interest. The testing protocol defines at least one element of the characterization data of physical characteristics of the first digital fingerprint that must be matched by characterization data of physical characteristics of a target digital fingerprint associated with a target physical object. If the one or more particular elements of the characterization data are matched within a predetermined threshold, an output is generated to indicate that the target physical object is the same first physical object of interest. The testing protocol may further define a first component of the physical object of interest that is expected to be replaced and a second component of the physical object of interest that is not expected to be replaced. Here, the digital fingerprints of the first and second components of the first physical object of interest can be compared to corresponding digital fingerprints of the target physical object in accordance with the stored testing protocol. Such testing protocols are clearly contemplated for physical objects of interest that are arranged as electronic systems, mechanical systems, electromechanical systems, or any other such systems wherein the at least one element defined by the testing protocol includes a combination of pieces of the target physical object.

FIG. 3 shows the target PCB 560 introduced with respect to FIG. 1 returned to the proprietor, where it undergoes scanning 524 and digital fingerprint processing the same as before it left control of the proprietor. The proprietor system 530 then queries the database system 540 or some other repository to identify and compare the newly acquired digital fingerprints to the one or more digital fingerprints stored before the PCB 508 left control of the proprietor.

In view of FIGS. 1-3, not only may the physical object (i.e., PCB 508) itself have to pass the authentication to be accepted back, but at least some of the original components of PCB 508 may also have to pass authentication. At the same time, the proprietor system 530 may determine that at least something has been installed in the sockets 510, 518 where additional components were expected to be installed. Those additional components may be scanned and digital fingerprinted as well for later identification or authentication. The proprietor system 530 can be used to ensure to an acceptable level of confidence that the parts added to the physical object (e.g., PCB 508) by a third party are legitimate parts, for example by comparing their digital fingerprints with those of the parts manufacturer. Those new prints may be added to the existing digital fingerprints of PCB 508 stored in the repository (e.g., manufacturer's database system 540). In general, this method allows for authentication of any combination of any pieces of the object or its components. This method therefore may be applied to physical objects with internal mechanical or computerized parts.

More generally, in this and other applications, an originating entity may desire to determine that the physical object returned or presented is indeed the same physical object as the one earlier released. The originating entity may also need to determine that expected changes to the returned or presented physical object in fact occurred. Further, the originating entity may, using the devices, methods, and systems described in the present disclosure, detect unexpected changes to the returned or presented object.

Retail Transactions Embodiment

In one embodiment, an entity such as a retailer may utilize a digital fingerprint and, optionally, one or more associated methods to uniquely identify merchandise owned or otherwise controlled by the entity, such as food, alcohol, parts, apparel, handbags, watches or other luxury items, collectables, sporting equipment, or other consumer goods of value. While the merchandise is in possession, or under control, of the retailer, or, in some cases, the retailer's predecessor in interest, one or more digital fingerprints are created for each object of merchandise. Each generated digital fingerprint is a unique identifier that provides a characterization of physical characteristics of the respective physical object, which may include features such as surface texture, x-ray images, shape, color, dimensions, weight, or any other suitable feature. The digital fingerprint record, or associated records, which are stored in an appropriate repository (e.g., data store, database, digital fingerprint repository, or the like), may also include information about packaging (e.g., shipping containers, boxes, bags, pallets, enclosures, or any other such packaging means), tags or other affixed identifiers, warranties, certificates, conditions of manufacture, guarantees, or other object-related information.

An unfortunately regular occurrence in trade is that customers may intentionally or accidentally attempt to return to a vendor objects that were not the original objects of the transaction. In one embodiment, a customer or other entity having possession or control of a certain physical object may attempt to return a counterfeit object in place of the legitimate one. In a similar embodiment, the customer may intentionally or accidentally substitute legitimate objects that are worn or flawed in place of the original object of the transaction. The systems described in the present disclosure enable vendors to avoid any returns that are not the original objects and, additionally, if desired, to avoid original objects not in their original condition.

In one embodiment, upon return of the item from the purchaser, the retailer, directly or through a third party, generates or otherwise acquires another digital fingerprint of the object, compares it with the original digital fingerprint, and receives a measure related to the confidence that the object is one that was expected back. The measure may be a level of confidence (e.g., 75% confidence, 95% confidence, 99.999% confidence, or some other level of confidence). Thus, the teachings of this disclosure benefit the retailer by protecting against fraud or other product interference by the buyer or customer, both accidental and intentional.

In one embodiment, a digital fingerprint system may be used to tie object data to a retail transaction (e.g., buyer records) relating to the physical object of interest. In the event the physical object (e.g., product) is returned, the retailer may use the digital fingerprint and other object characterization data to authenticate that the returned object is the exact physical object from a prior transaction before the retailer resumes possession or otherwise accepts the returned physical object. By using the disclosed system, the retailer can avoid the risk of failing to detect an erroneous object and may also avoid the belated discovery of an erroneous or fraudulent object. Here, the retailer can discover the error or fraud at the point where return of the object is being attempted, thereby avoiding the need to recover from an absconded buyer or possessor.

To that end, in one embodiment, one or more digital fingerprints may be added or linked to sales data in a proprietor or retailer system. The retailer may choose to incorporate compliance terms or rules from their return policies that prevent the return of legitimate objects that have broken contractual terms.

Figure 4:
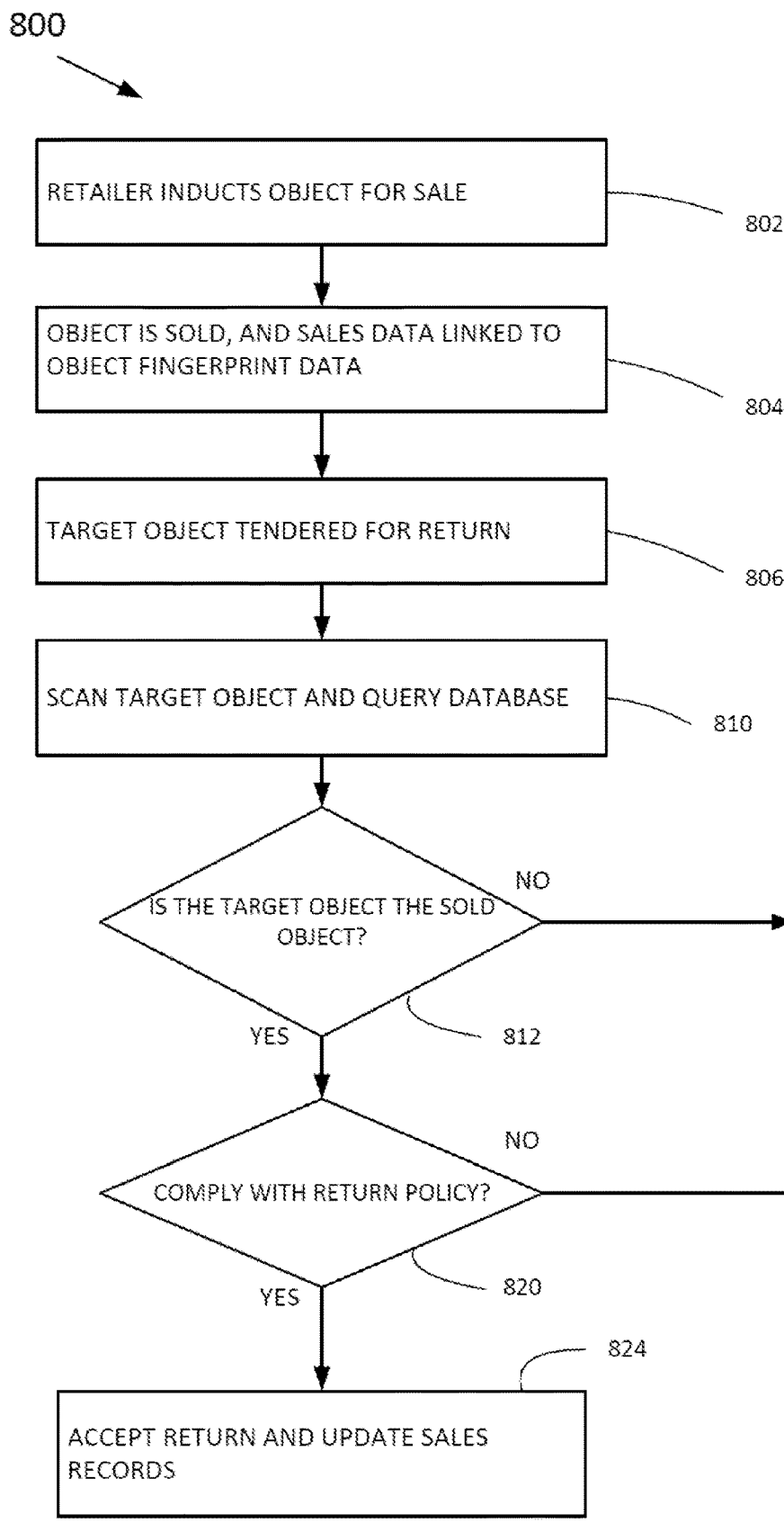
FIG. 4 is a data flow diagram of a process for utilizing digital fingerprints to ensure at an acceptable level of confidence that tendered returns of objects are valid and acceptable.

FIG. 4 is a data flow diagram of a process for utilizing digital fingerprints to ensure, with an acceptable level of confidence, that tendered returns of objects are valid and acceptable. The operations of the data flow diagram may be performed by any number of computing devices, alone or in a cooperative relationship, carrying out the functions of the database system embodiments described in the present disclosure. FIG. 4 illustrates one example of such a process 800, however, many other processes are contemplated. In the process 800, a retailer, proprietor, or other vendor is designated as an originating entity that is permitted to access and use a digital fingerprint repository (e.g., database system 540 of FIGS. 1, 3). The originating entity inducts an item for sale, block 802, into the digital fingerprint repository.

In at least some cases, the induction may include generating (e.g., acquiring, receiving, forming, or otherwise obtaining) a digital fingerprint associated with the item for sale. In some cases, the digital fingerprint will optionally include characterization data of physical characteristics of the object for sale to uniquely identify the object for sale. In these or other cases, the digital fingerprint will include digital fingerprints of at least one selected component of the object for sale to uniquely identify the at least one selected component. The characterization data, if it is included, may include location information, relative location information, color information, size information, curvature information, shape information, and any other feature information that can be used to characterize a physical object or a component of the physical object. Accordingly, in these and other cases, the characterization data of physical characteristics of a digital fingerprint may be responsive to a natural structure of the physical object. In at least one case, the characterization data may include any number of first feature vectors, wherein a feature vector includes a plurality of values responsive to a specific feature or region of interest of the associated physical object. One of skill in the art will recognize that the characterization data of physical characteristics of a physical object, such as the object for sale, can include one or more sets of features that include surface texture, x-ray image data, shape data, color data, dimension data, weight data, and any other such data.

When the item (i.e., the physical object) is sold, the sales data may be linked to the stored digital fingerprint data, block 804. Alternatively or additionally, the digital fingerprint data may be linked to the corresponding sales record. In some fashion the two data elements or records may be associated. In at least some cases, the sale of the object is deemed to have occurred at a first time, and at a later, second time, after the object has been outside of control of the proprietor, a "target" object will be analyzed to determine if the target object is the same original object that was sold.

At block 806, an unknown target object is subsequently tendered for return. The target object is putatively the original object that was previously inducted into the system and then sold. The target object is scanned and target digital fingerprints generated. The scanning may be done locally or remotely. The generation of the one or more digital fingerprints may be done locally or remotely. At a time subsequent to when the first digital fingerprint of the object to be sold was inducted, a target digital fingerprint of the target object is generated (e.g., acquired, received, formed, or otherwise obtained). The target digital fingerprint may optionally include characterization data of physical characteristics of the target object to uniquely identify the target object. The target digital fingerprint may optionally include digital fingerprints of at least one component of the target object to uniquely identify the at least one component of the target object.

An identifier, object description, characterization data, digital fingerprint, or some other information may be used to quickly search (i.e., query) the repository (e.g., database, data store, or the like) to locate the original (e.g., sold) object records, block 810. In these cases, the target identifier, object descriptor, characterization data, target digital fingerprint, feature data, or other such information may or may not exactly match the corresponding information of the original object to be sold. That is, in at least some optional cases, querying the repository based on the target information (e.g., target identifier, object descriptor, characterization data, digital fingerprint, feature data, or other information) is arranged to identify stored corresponding digital fingerprint record that matches the queried data of the target object within a predetermined similarity threshold. The predetermined similarity threshold may be a percentage, an integer, a number of matching data points, or some other acceptable level of confidence. In at least some cases, the predetermined similarity threshold may be manually set, programmatically set, dynamically changed, or configured in some other way.

If the target digital fingerprints do not match the originally inducted digital fingerprints of the object to be sold within a given confidence level, query 812, the tendered object may be declined, block 814. If the target digital fingerprint and the originally inducted digital fingerprint of the object to be sold do match within the determined level of confidence (e.g., predetermined similarity threshold), then the tendered object is determined to be the original object. In these and other cases, an output may be generated that indicates that, based on the target digital fingerprint, the target object is the object that was sold. That is, the output (e.g., a message, a visual indicator, an audio signal, or any other such report) is generated based on the comparison.

In at least some optional cases, the process may further test whether the tendered return complies with applicable return policies at query 820. For example, a time elapsed since the sale date may exceed the policy time limit. In case of any violation of a policy, the tendered object may be declined at block 814. Otherwise, the return may be accepted and the sale record updated at block 824.

The retailer may also provide the ability to authenticate purchased objects to the customer. This feature may be used by the buyer or customer to verify that their return is in compliance with the seller's return policies prior to attempting to make a return. For example, a retailer could provide this functionality inside of their retail mobile software application, which customers optionally use to initiate returns and authenticate the object and its packaging. In one example, a smart phone camera may be used as the scanner device, and digital fingerprint software in the mobile software application processes the scanned image(s) to generate the digital fingerprints to identify the object. This data may be used to remotely query the retailer system over a network such as the Internet.

Packaging, Tags, and Seals Embodiment

Digital fingerprinting of a physical object may include any packaging (e.g., shipping containers, boxes, bags, pallets, enclosures, or any other such packaging means), tags, certificates, seals, or other peripheral structures affixed to the physical object, such as where the retailer wants to ascertain if any particular portion of the object or its packaging has been substituted upon return of the good (i.e., the physical object).

In a further embodiment, the digital fingerprint of the physical object may be used to access the records concerning the physical object; something that can happen only if the physical object passes the legitimacy test. Put another way, the digital fingerprint will fail to match a digital fingerprint stored in a repository record if the physical object is not legitimate.

In another embodiment, the taught system can be adapted to forensically inform if there was any tampering of the original object. Such detection is enabled by the digital fingerprint authentication devices, systems, and methods described in the present disclosure. In an embodiment, for example where safety seals are used, a buyer may agree that if this seal is broken, the buyer forfeits the ability to return the item. Making the safety seal part of the digital characterization of the object will give the seller an acceptably high-confidence method to tell if the seal was broken, repaired, replaced or experienced other forms of tampering that is detectable by reference to the earlier generated digital fingerprint. The requirement that the safety seal be intact may be part of a seller's specific return policies.

The digital fingerprint may also be used to ensure with an acceptable level of confidence that an original object is reunited with its original packaging or contents. For example, rare coin retailers sell coins that are commonly graded and certified by experts, such as Professional Coin Grading Service (PCGS). After grading, rare coins are individually sealed in cases or containers which may also be assigned a unique serial number or other identifier. These casings are valuable because they enable interested parties to look up the certification associated with the serial number on the packaging which was intended for the original coin that was graded. If the coin is returned, the retailer could validate that both the coin's digital fingerprint and the casing's digital fingerprint were matched or associated correctly in the repository. Again, each of the digital fingerprints will have to match, to a predetermined similarity threshold or some other level of confidence, respective records that are associated in the repository.

Figure 5:
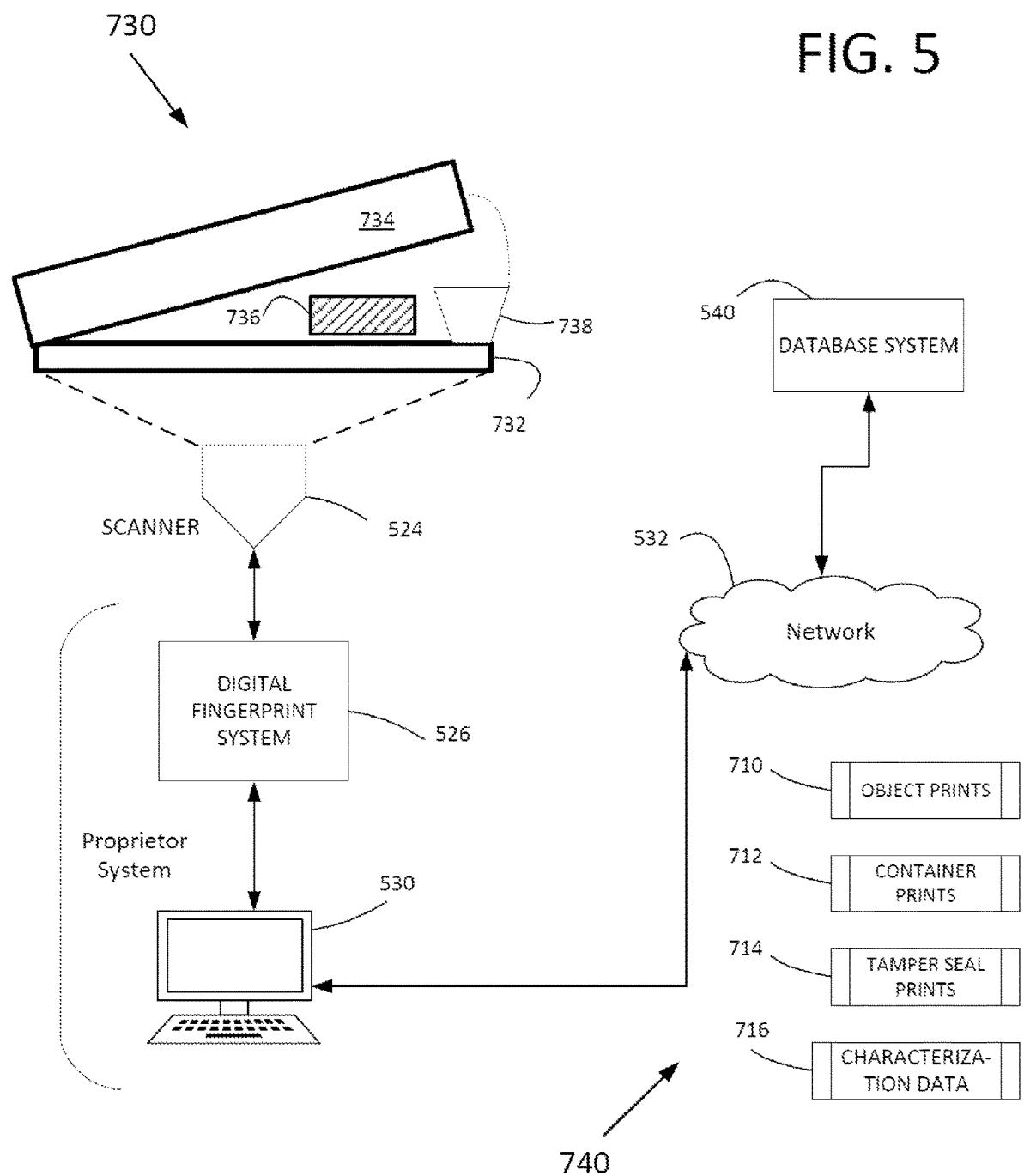
FIG. 5 is a schematic of a system and method for inducting an object and its packaging into a digital fingerprint database system.

FIG. 5 is a system and method for inducting an object and its packaging into a digital fingerprint database system. In FIG. 5, a simplified diagram represents a package assembly 730 comprising package base 732 and a mating package top 734, the base and top arranged to enclose an object 736. This simplified diagram should not be taken literally; rather, a wide variety of packaging arrangements and materials are intended to be within its scope. A tamper seal 738 may be applied to seal the package 730 after the object 736 is installed.

As described with regard to FIG. 1, a proprietor system may include a scanner 524. In the present example, the scanner (or multiple scanners) may be arranged to scan the object 736, the package base 732, package top 734, and the tamper seal 738.

Referring again to FIG. 1, the scanned images are processed in a digital fingerprinting system 526, which may be a software component of a proprietor system or server 530. Returning to FIG. 5, the proprietor system 530 generates digital fingerprints including some or all of physical object digital fingerprints 710, container digital fingerprints 712 from both the package base 732 and the package top 734, and tamper seal digital fingerprints 714. Information 716 (e.g., digital fingerprints, characterization data, testing protocol data, provenance data, authentication data, feature data, certificate data, most recent authentication data, transaction history data, and other such data), can define one or more physical characteristics that are expected to have changed between a first time, when the object 736 is in control of a first entity, and a second time, when the object 736 has been returned to control of the first entity, after having been out of control of the first entity between the first and second times. All of these digital fingerprints 710, 712, 714, information 716, and other such data may be stored as records 740 in the database system 540 repository. These various digital fingerprints may be part of, or linked to, a record of the object 736 in the database system 540 repository. This data can be used later, for example, upon return or tender of an unknown or target package assembly. Various elements of the target package assembly (e.g., package base, top, tamper seal, etc.) may be scanned again, and digital fingerprints generated from those new scans can be compared to the stored digital fingerprint data to try and confirm with acceptable confidence that the target package is the same package as the original, and that the original package has not been tampered with. Optionally, the target package can be opened, and the enclosed object can be scanned and authenticated.

In a sales context, other data, such as the date of sale and sale price, may be tied to a digital fingerprint. For example, a retailer denying the return of an object when that object has surpassed the time period allotment allocated by the object's return policy. This will allow retailers to protect against buyers who purchase two identical or near-identical items some time apart and, within the return window for the second item, return the first item. With the teachings of this disclosure, the retailer will be able to deny the return of an aged item, even when the items appear identical to the naked eye. This is especially useful in situations where discovering certain characteristics of an object, such as grade, age, wear, fatigue, and other such time-based deficiencies would require delays, costly examination, and other inefficient or undesirable business practices.

Museum Applications Embodiment

There are many reasons why museums may lend out art objects or that collectors may lend them to museums. For the museum, such lending can be a source of income or publicity. For the collector, having an item on display can raise its value substantially. There have, however, been accounts of museums discovering that items in their collections were counterfeit and with no ability to determine when the substitution had taken place. There have been other cases where an individual has loaned a piece of art to a museum, and a substitute has been returned. In one embodiment, an entity such as a museum or an art collector can use an embodiment of the taught system to uniquely identify artifacts such as paintings or sculptures for lending, rental, hypothecation, or other purposes. Examples of parties wanting to take temporary possession of the types of physical objects now under consideration include wealthy individuals or entities, potential buyers, other museums, and still others.

Through the devices, methods, and systems described herein (i.e., the teaching of the present disclosure), a specific and unique identity (i.e., a digital record that includes at least one digital fingerprint) may be created for each object while in the possession of the entity. In an embodiment, this identity includes a digital model based on the physical characteristics of the object, which may include digital representations of features such as surface texture, x-ray images, shape, color, dimensions, weight, and still other features. Information may optionally be added to this digital model about an object's shipping container or other packaging, an affixed identifier, an affirmation such as a warranty or other such guarantee, a certificate, a condition of manufacture, any number of certificates, a most recent authentication, and any other information related to the physical object or an associated controlling entity. A model digital fingerprint may, of course, be generated from the digital model using any of the information in or otherwise associated with the digital model according to the teaching herein.

Induction and authentication can be done partially or completely by third parties on behalf of the originator in some embodiments. Upon receipt of an object being returned, the original museum or art lender can use the devices, methods, and systems described in the present disclosure to establish, with an acceptable level of confidence, that the artifact being returned is indeed the original object that left the physical custody of the originating entity or an otherwise entitled entity.

One intention of at least some embodiments of the described method is to provide a mechanism to authenticate an object when it leaves the owner's physical presence and later when what is putatively the same object returns. Note, this is not contingent upon a transaction between a set of parties but is in view in any scenario where the digitally-fingerprinted object leaves the physical possession of the responsible party. This also includes, for example, scenarios where entities, such as owners or museums, store artifacts in warehouses, turn them over to moving companies or other third parties, and want to ensure that the object returned is the original object stored.

This scenario also applies to objects, such as museum artifacts or expensive jewelry, that are sent out for repair. Such devices, methods, and systems allow for authentication of any combination of any pieces of the object or its components. This, therefore, applies to objects with internal mechanical or computerized parts.

The described devices, methods, and systems may also be applied to identifiers or any additive structures (e.g., markings), such as seals that prevent espionage and other spying or bugging devices being planted. Each seal may be incorporated into the digital fingerprint record and may be used to validate the authenticity of the object. One such embodiment is illustrated with the tamper seal 738 in FIG. 5. Digitally fingerprinting the label itself is described elsewhere.

In the event an object such as a painting or rare coin is lost or misplaced and later recovered while away from the original entity, one or more previous digital fingerprints of the object can be used to find the responsible entity associated with that item. For example, a museum lends another museum an artifact. If somehow the artifact is misplaced, or its pedigree is confused at any point, a digital fingerprint can be used to ascertain the responsible party, correct pedigree, and, if necessary, initiate a return.

The teachings of the present disclosure can also be reversed. When an object of value is recovered from a thief, for example, an earlier digital fingerprint of the object of value can be compared to a digital fingerprint generated by the police, for example, and the object then can be restored to its rightful owner. Further, the present authentication teachings can be used to identify a stolen object and/or stolen components of an object in court, obviating certain evidentiary challenges.

Airline or Airport Operator Applications Embodiment

In another embodiment, a third party such as a transportation or logistics provider uses an embodiment of the taught system to digitally fingerprint objects on behalf of the responsible entities or owner(s). These devices, methods, and system provide the owner with high confidence in the return of their specific items. In general, this benefit protects the owner from fraud, substitution, and loss while their possessions are in the custody of a third party, such as a transportation or logistics provider. The same service could apply to a warehousing entity.

Consider an example such as an airline or airport operator who takes responsibility for transporting and returning baggage or cargo originating with a passenger or shipper. Through the teaching described herein, a specific and unique digital fingerprint is created for each object that belongs to a carrier, passenger, set of passengers, or others that will eventually be used for authenticated return on behalf of the original party. Using this teaching, the owner or the airline or airport operator, alone or in concert, generates or otherwise acquires a digital fingerprint of each object when the respective object enters their possession. As described herein, the digital fingerprint may include features such as surface texture, x-rays images, shape, color, dimensions, and weight. The airline associates the object data to the relevant passenger records and takes interim possession of the object.

The airline or airport operator may use this digital fingerprint-based identity to authenticate the object on behalf of the customer or any other entity at any point through its journey up to receipt by the passenger at his destination. This includes positions within the airport or carrying aircraft such as security screening, checkpoints, ramp, staging area, aircraft cargo hold, customs, etc. If a bag or cargo goes astray and is later recovered, a digital fingerprint can be generated, compared to a database of lost items or items that had been entrusted to the entity, and returned to its owner.

The digital fingerprint also can be used by airlines or others to prevent other passengers from falsely or improperly claiming objects as their own, by linking the authentication of the object with authentication of the recipient. Authentication of the recipient may involve identity documents, biometric authentication, or other approaches. The identifying information of the object and that of the expected recipient may be linked in a file such as an airline passenger record.

Maintenance and Repair Applications Embodiment

This section speaks often in the context of aircraft manufacturing, but it should be understood that all forms of maintenance and repair are in view. In many but not all cases, maintenance and repair applications recognize a first point in time when a physical object is under the control of an entity and a second point in time, later than the first point in time, when the physical object has left control of the first entity, and then been returned to the control of the first entity. During the time when the object was not under the control of the first entity, any number of other entities may have had control of the object. Considering at least some of these cases, an elapsed time between the first time and the second time may be determined, and when determining whether or not the returned object and optionally any of its components are the same (i.e., the same original object and the same components), a predetermined similarity threshold may be determined. The predetermined similarity threshold, or any other acceptable level of confidence, may be adjusted based on the elapsed time, which will accommodate wear and tear of the physical object between the first time and the second time.

In another embodiment, the teachings described herein may be used to digitally fingerprint objects before being sent off for inspection, repair, or maintenance. Here the digital fingerprint is used as a high-confidence tool in concert with getting the item back to alert of any potential misconduct while the object is out of the responsible entity's custody. This is done on behalf of the responsible entities or owner(s) of the object. Using this approach means the owner can validate, directly or via a third party, that the object returned has either new components per specification or service bill and/or the same original components as when the object left the owner(s) possession. An example of a circuit board is described herein in the context of contract manufacturing. In general, this digital fingerprint service protects the owner from fraud, substitution, and loss while their possession(s) are in the custody of a third party such as an inspection, maintenance, or repair provider.

Consider an example of an aircraft being sent to a Maintenance, Repair, Overhaul (MRO) for service. At MROs, line maintenance and specialized, high-skilled work is performed on aircraft engines, airplane components, avionics, airframes, and the like. The teachings of the present disclosure can be used to validate that specified repairs were made by the MRO agent(s) performing the service and, for example, that authorized parts were used. Embodiments can compare digital fingerprints of parts that were intended to be repaired or replaced. Also in view is the originator using the teaching of the present disclosure to ensure with an acceptable degree of confidence that the parts added to the object by a third party are legitimate parts, for example by comparing digital fingerprints of the installed parts with corresponding digital fingerprints of the parts manufacturer.

Digital fingerprint comparisons can also be used to monitor for the undocumented substitution of aircraft parts or components. Responsible parties would be alerted to unexpected activity, where fraud or theft might have occurred. In this case, the digital fingerprint can also be used to aid in the forensic tracking of the original part(s) that were stolen or lost.

The removal of a part from one aircraft for use in another is generally not allowed. The teachings of this disclosure can be used to extract a digital fingerprint of the object upon its return, send that fingerprint to the manufacturer, and determine with an acceptable level of certainty whether the object had already been installed in an aircraft. Further, if through other sources it is found that an object had been taken illegitimately from one aircraft and there is a chance it was substituted into another aircraft, the teachings of this disclosure could be used to search aircraft receiving such parts to determine where the part went, and likely present evidence of the time and place of the illicit substitution.

Other data, such as the date that part was replaced, part number, or recall information, may be associated with the digital fingerprint in a same or different repository. The responsible entity or the maintenance/repair agent can have access to use the digital fingerprint to inspect parts. For example, a repair technician may use a digital fingerprint of a part to learn its specific pedigree when evaluating the health of the individual aircraft part. Such "health" may include whether the part is an original or a refurbished part, whether the part is a rotable part that has passed its useful lifetime, and so on.

Authentication Regions and Digital Fingerprinting

Because the devices, systems, and methods described herein may be used with many different types of objects, it is sometimes helpful to describe what parts of the digital images of the objects may be used for the extraction of features for identification or authentication purposes. This can vary widely for different classes of objects. In some cases, it is the image of the entire object; in other cases, it will be a specific sub-region of the image of the object.

For instance, for a photograph, the digital image of the entire photograph may in some cases be used for feature extraction. Each photograph is different, and there may be unique feature information anywhere in the photograph. So, in this case, the selected authentication region may be the entire photograph.

Multiple authentication regions may be used for fingerprints for several reasons. One reason may be to focus attention on regions where significant variations take place among different similar objects that can be distinguished. Another reason may be to avoid focusing attention in the same objects on regions of little significance where there is little or no variation among different objects. In this way, the authentication region may be suitably used to include regions of heightened interest and to eliminate regions of little interest.

A bank note, for example, has a sufficient number of unique features that it can be authenticated if a few small arbitrary regions scattered across the surface are fingerprinted, along with recognizing the contents of a region telling the value of the bank note and one containing the bank note's serial number. In such a case, the digital fingerprints of any region along with sufficient additional information to determine the bank note's value and its purported identity may be sufficient to establish the authenticity of the note, and multiple fingerprinted regions are used solely in the event that one or more regions may be absent (e.g., tearing, defacement, or the like) when the bill is later presented for authentication.

Sometimes, however, specific regions of an object are authenticated to provide acceptable confidence that the item is both authentic and has not been altered. A passport provides an example. On a passport, the features preferably used for authentication are extracted from regions containing such specific identification information as the passport number, recipient name, and recipient photo. In that case, a template can be defined that includes all those regions whose alteration from the original would invalidate the passport; such regions including the passport holder's photo and unique personal data.

The ability to define and store a selected authentication region for a given class of objects may provide significant benefits to the user. In many cases it is much easier to scan a limited region of an object than the entire object. For instance, in the case of an article of designer clothing, it is much easier to take a picture of the manufacturer's label than it is to take a picture of the entire garment. Further, defining such regions enable the detection of partial alteration of the object.

Once an authentication region is defined, specific applications can be created for different markets and classes of objects that can assist the user in locating and scanning any number of selected authentication regions. For instance, an appropriately sized location box and crosshairs can automatically appear in the viewfinder of a smartphone camera application to help the user center the camera on the authentication region, and automatically lock onto the region and take the picture when the camera is focused on the correct area.

In many cases, objects may have permanent labels or other identifying information attached to them. These can also be used as features. For instance, wine may be put into a glass bottle and a label affixed to the bottle. Since it is possible for a label to be removed and reused, simply using the label itself as the authentication region is often not sufficient. In this case the authentication region may be defined to include both the label and the substrate the label is attached to, which in this case is some portion of the glass bottle. This label and substrate approach may be useful in defining authentication regions for many types of objects, such as consumer goods and pharmaceutical packaging. If a label has been moved from its original position, this can be an indication of tampering or counterfeiting. If the object has "tamper-proof" packaging, this may also be useful to include in the authentication region.

In some cases, multiple authentication regions may be used to extract unique features. For a firearm, for example, features may be extracted from two or more different parts of the weapon. Here, authentication may include matching digital fingerprints of each of the different parts of the original. Alternatively, or additionally, since two or more parts may have been taken from the original weapon and affixed to a weapon of substandard quality, it may also be important to determine whether the relative positions of the two or more parts have changed as well. In other words, some embodiments may determine that the distance or other characteristic between Part A's authentication region and Part B's authentication region is effectively unchanged, and only if that is accomplished can the weapon be authenticated.

Object Feature Template Definition and Digital Fingerprinting

When a new type or class of object is being scanned into at least some of the system embodiments described herein for the first time (FIG. 1), the system can create an Object Feature Template that can be used to improve subsequent authentication operations for that class of objects. The improvements can be by way of faster digital fingerprint generation, more efficient repository operations, and in other ways. The Object Feature Template can either be created automatically by the system, or by using a human-assisted process.

An Object Feature Template is not required for the system to authenticate an object, as the system can automatically extract features and generate a digital fingerprint of an object without it. However, the presence of a template can improve the authentication process and add additional functionality to the system. A non-limiting, exemplary Object Feature Template is represented in Table 1.

TABLE 1

Example Object Feature Template.

CLASS:
[Description of the object]
United States Passport
AUTHENTICATION REGION:
[Description of the authentication regions for the object]
Region 1: (x1, y1, z1), (x2, y2, z2)
.
.
Region n
REGION MATCH LIST
[List of the regions that are required by the template to match to identify an object]
Region List: 1..n
FEATURES:
[Key features of the object]
Feature 1: Passport Number
Feature 2: Photo
Feature 3: First Name
Feature 4: Last Name
.
.
Feature n
METHODS:
[Programs that can be run on features of an object]
Feature 2:
  Photo Method 1: [checkphoto.exe] Check for uneven edges indicating photo substitution
.
.
  Method n
Feature n
  Method n
ADDITIONAL DATA
[Additional data associated with the object]
Data 1: example data
.
.
Data n The uses of the Object Feature Template include, but are not limited to, determining the regions of interest on the object, the methods of extracting fingerprinting feature information and other information from those regions of interest, and methods for comparing such features at different points in time. The name "object feature template" is exemplary; other data with similar functionality and one or more different identifiers should be considered equivalent.

Once an object has been scanned and at least one authentication region has been identified, the final digital image that will be used to create the unique digital fingerprint for the object is created. This image or set of images will provide the source information for the feature extraction process.

A "digital fingerprinting feature" is a feature of the object that is innate to the object itself, which may be a result of the manufacturing process, a result of external processes, or of any other random or pseudo random process. For example, gemstones have a crystal pattern which provides an identifying feature set. Every gemstone is unique, and every gemstone has a series of random flaws in its crystal structure. This crystal pattern may be used to generate feature vectors for identification and authentication.

A "feature" in this description as used in the generation of a digital fingerprint is not concerned with reading or recognizing meaningful content by using methods like optical character recognition (OCR). For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to the printed serial number on the label, but in the normal course of feature extraction during the fingerprinting process there is no effort to actually "read" or recognize the printed serial number.

As part of identifying the object, however, for ease of comparison of fingerprint features with those of the original which are stored in the object database, such information may in some embodiments be read and stored by utilizing such techniques as optical character recognition. In many cases, serial numbers may be used as a primary index into a manufacturer's database, which may also contain the digital fingerprints. It would be faster, for example, to determine whether a bank note being inspected is a match with a particular original if the serial number, say "A93188871A," can be used as an index into the digital fingerprinting database, rather than trying to determine which digital fingerprint in the repository is matched by iterating through many (e.g., hundreds, thousands, millions, or some other number) of fingerprints. In this case, and in similar cases of, weaponry, passport serial numbers, and other objects, the index recognition may speed up the comparison process, but an index or other such conventional recognition is not essential to the comparison process.

Once a suitable digital fingerprint of an object is generated, the digital fingerprint may be stored or "registered" in a repository such as a database. For example, in some embodiments, the digital fingerprint may comprise one or more fingerprint features, which are stored as feature vectors. The repository should be secure. In some embodiments, a unique identifier (ID) such as a serial number also may be assigned to an object. An ID may be a convenient index in some applications. However, such an ID is not essential, as a digital fingerprint itself can serve as a key for searching a repository. In other words, by identifying an object by the unique features and characteristics of the object itself, identifiers, labels, tags, etc., become unnecessary to an authentication of the object.

Because in many of the cases described herein features are extracted from images produced under variable lighting conditions, it is unlikely to a determined and acceptable statistical certainty (e.g., less than 20% chance, less than 1% chance, less than 0.01% chance, less than ($1 \times 10^{\wedge}(-10)$)) chance, or some other value) that two different "reads" will produce the exact same digital fingerprint. In a preferred embodiment, the system is arranged to look up and match items in the database when there is a "near miss." For example, two feature vectors, [0, 1, 5, 5, 6, 8] and [0, 1, 6, 5, 6, 8], are not identical, but by applying an appropriate difference metric, the system can determine that the two feature vectors are close enough to confirm to an acceptable level of certainty that they are from the same item that has been digitally fingerprinted or inducted before. One example is to calculate Euclidean distance between the two vectors in multi-dimensional space and compare the result to a threshold value. This is similar to the analysis of human fingerprints. Each fingerprint taken is slightly different, but the identification of key features allows a statistical match with an acceptably high degree of certainty.

Hardware and Software

At least some of the structures (e.g., devices, apparatus, systems and the like) discussed herein comprise electronic circuits and other hardware along with associated software. For example, a conventional portable device (e.g., mobile phone, smartphone, tablet, wearable computer, Internet of Things (IoT) device, and other such computing devices) is likely to include one or more processors and software executable on those processors to carry out the operations described. The term software is used herein in its commonly understood sense to refer to programs or routines (e.g., subroutines, objects, plug-ins, etc.), as well as data, usable by a machine or processor. As is well known, computer programs generally comprise instructions that are stored in tangible, non-transitory machine-readable or computer-readable, storage media. Some embodiments of the present disclosure may include executable programs or instructions that are stored in machine-readable or computer-readable storage media, such as a digital memory. One of skill in the art will recognize that a computer, in the conventional sense, is not required in any particular embodiment. For example, various processors, embedded or otherwise, may be used in equipment taught in the present disclosure.

Memory for storing software is well known. In some embodiments, memory associated with a given processor may be stored in the same physical device as the processor (i.e., on-board memory); for example, RAM or FLASH memory disposed within an integrated circuit microprocessor or the like. In other examples, the memory comprises an independent device, such as an external disk drive, storage array, or portable FLASH key fob. In such cases, the memory becomes associated with the digital processor when the two are operatively coupled together, or in communication with each other, for example by an I/O port, a communication bus, network connection, etc., such that the processor can read information (e.g., a file) stored on the memory. Associated memory may be read-only memory by design (ROM) or by virtue of permission settings, or not. Other examples include, but are not limited to, WORM, EPROM, EEPROM, FLASH, etc. Those technologies often are implemented in solid state semiconductor devices such as integrated circuits. Other memories may comprise moving parts, such as a conventional rotating disk drive. All such memories are machine readable, computer-readable, or another like term, and all such memories may be used to store executable instructions for implementing one or more functions described herein.

A software product refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. Those of ordinary skill in the art recognize that software can be distributed via electronic transmission (e.g., download), in which case there will at least sometimes be a corresponding software product at the transmitting end of the transmission, the receiving end of the transmission, or both the transmitting and receiving ends of the transmission.

As described herein, for simplicity, a user of the devices, systems, and methods may in some cases be described in the context of the male gender. It is understood that a user can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

Unless defined otherwise, the technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The loop chain embodiments as taught in the present disclosure provide several technical effects and advances to the field of authentication, identification, tracking, and many other fields as apparent to those of skill in the art. Technical effects and benefits include the ability for an originating entity to generate or otherwise acquire at least one digital fingerprint of an object, store the at least one digital fingerprint in a repository, and then give up control of the object with confidence that the exact same object can be later identified to an acceptable level of certainty. These and other technical effects are implemented with scanning technology, digital image processing technology, and other computing technology.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method of generating a loop chain for authentication, comprising:
    designating, in a database system, an originating entity that is permitted to access the database system, wherein the database system includes a processor and a data store;
    storing, in the data store, a first digital fingerprint record of a first physical object having one or more components, wherein the first digital fingerprint record includes: (a) characterization data of physical characteristics of the first physical object to uniquely identify the first physical object, and (b) a first component digital fingerprint of at least one selected component of the first physical object to uniquely identify the at least one selected component;
    storing data defining a testing protocol in the data store, the testing protocol linked to the first digital fingerprint record, the testing protocol defining at least one element of the characterization data of physical characteristics of the first digital fingerprint record that must be matched by the characterization data of physical characteristics of the target digital fingerprint record to generate the output that indicates that the target physical object is the first physical object, the testing protocol further defining a first component of the first physical object that is expected to be replaced and a second component of the first physical object that is not expected to be replaced;
    at a time subsequent to said storing the first digital fingerprint record in the data store, receiving, in the database system, a target digital fingerprint record, wherein the target digital fingerprint record includes: (a) characterization data of physical characteristics of a target physical object having one or more components and the characterization data uniquely identifies the target physical object, and (b) a target component digital fingerprint of at least one component of the target physical object to uniquely identify the at least one component of the target physical object;
    querying the data store based on the target digital fingerprint record;
    comparing digital fingerprints of the first and second components of the first physical object to corresponding digital fingerprints of the target physical object in accordance with the stored testing protocol; and
    generating an output that indicates the target physical object is the first physical object, in response to the querying identifying the stored first digital fingerprint record that matches the target digital fingerprint record within a predetermined similarity threshold.

2. The method of claim 1, further comprising:
    identifying a component of the target physical object that does not match a corresponding component of the first physical object; and
    indicating in the output that the corresponding component of the first physical object was removed, altered, or replaced between a first time when the first digital fingerprint record was acquired and a second time, after the first time, when the target digital fingerprint record was acquired.

3. The method of claim 2, further comprising:
    determining an elapsed time between the first time and the second time; and
    adjusting the predetermined similarity threshold based on the elapsed time to accommodate wear and tear of the first physical object between the first time and the second time.

4. The method of claim 2, further comprising:
    storing data defining a testing protocol in the data store, the testing protocol linked to the first digital fingerprint record and defining at least one element of the characterization data of physical characteristics of the first physical object that is expected to have changed between the first time and second time; and
    based on the testing protocol, excluding, from the matching of the first digital fingerprint record and the target digital fingerprint record, the at least one element of the characterization data of physical characteristics of the first physical object that is expected to have changed between the first time and second time.

5. The method of claim 1, further comprising:
identifying a particular component of the target physical object that matches a corresponding particular component of the first physical object; and
indicating in the generated output that the corresponding particular component of the first physical object was not removed, not altered, or not replaced from the first physical object between a first time when the first digital fingerprint record was acquired and a second time, after the first time, when the target digital fingerprint record was acquired.

6. The method of claim 1, wherein the characterization data of physical characteristics of the first digital fingerprint record is responsive to a natural structure of the first physical object and includes at least a first feature vector, wherein the first feature vector includes a plurality of values responsive to a specific feature or region of interest of the first physical object.

7. The method of claim 1, wherein the first physical object is an electronic system, a mechanical system, or an electromechanical system, and wherein the at least one element defined by the testing protocol includes a combination of pieces of the target physical object.

8. The method of claim 1, wherein the characterization data of physical characteristics of the first physical object includes at least one set of features, the at least one set of features including at least one of surface texture, x-ray image data, shape data, color data, dimension data, and weight data.

9. A computer implemented system implementing a loop chain for authentication, comprising:
a scanner configured to capture sensor data of a selected object having one or more components, while the selected object is under control of a proprietor;
the scanner further configured to, after the selected object has been out of control of the proprietor for a determined time period, capture sensor data of a target object having one or more components that is possibly the selected object;
a digital fingerprint system configured to generate from the sensor data of the selected object a digital fingerprint, wherein the digital fingerprint includes characterization data of the selected object, the characterization data identifying at least one of the one or more components that is expected to change over time, the digital fingerprint arranged to uniquely identify the selected object;
the digital fingerprint system further configured to generate a target digital fingerprint from the sensor data of the target object, wherein the target digital fingerprint includes characterization data of the target object, the target digital fingerprint arranged to uniquely identify the target object; and
a database system having a processor and a data store, wherein the data store is configured to store the digital fingerprint and wherein the processor is configured to:
query the data store, based on the target digital fingerprint, to authenticate the target object as the selected object, wherein the at least one of the one or more components is excluded from authentication of the target object as the selected object; and
generate a message based on the result of the query.

10. The system of claim 9, wherein the selected object is assigned a unique identifier while the selected object is under the control of the proprietor, wherein the unique identifier includes a digital model based on physical characteristics of the selected object, said physical characteristics including at least one of surface texture, x-ray image data, shape data, color data, dimension data, and weight data.

11. The system of claim 10, wherein the database system is further configured to store related data associated with the digital model, wherein the related data includes data identifying a shipping container of the selected object.

12. The system of claim 10, wherein the database system is further configured to store at least one of certificate data, provenance data, most recent authentication data, and transaction history data in association with the digital fingerprint.

13. The system of claim 10, wherein the digital model includes information about at least one of packaging, an affixed identifier, a warranty, a certificate, a condition of manufacture, and a guarantee.

14. The system of claim 10, wherein the processor is further configured to generate a model digital fingerprint from the digital model.

15. The system of claim 10, wherein the digital fingerprint system is configured to generate the digital fingerprint by:
acquiring scan data of a portion of at least one of a packaging, at least one tag, a certificate, a seal, or at least one affixed structure of the selected object; and
detecting, based on a digital fingerprint generated from the scan data, that at least one of the one or more components of the selected object has been substituted.

16. The system of claim 15, wherein the scan data includes digital image data captured by at least one of the scanner, a camera, or a specially adapted sensor or sensor array configured capture digital image data.

17. The system of claim 15, wherein the scanner further includes at least one of a set of sensors that includes at least one of a microscope, a smartphone camera, a video camera, an x-ray machine, a sonar, an ultrasound machine, and a microphone configured to capture the scan data.

18. A non-transitory computer-readable storage medium whose stored contents configure a computing system to perform a method, the method comprising:
capturing sensor data of a selected object having a plurality of components while the selected object is under control of a proprietor;
generating a digital fingerprint from the sensor data, wherein the digital fingerprint includes characterization data of the selected object, the digital fingerprint arranged to uniquely identify the selected object, the characterization data identifying one of the plurality of components of the first physical object that is expected to be replaced and identifying another of the components of the first physical object that is not expected to be replaced;
storing the digital fingerprint in a data store of a database system;
at a time subsequent to when the selected object was under control of the proprietor, capturing target sensor data of a target object having one or more components;
generating a target digital fingerprint from the target sensor data, wherein the target digital fingerprint includes characterization data of the target object, the target digital fingerprint arranged to uniquely identify the target object;
querying the database system, based on the target digital fingerprint, to authenticate the target object as the selected object; and
generating a message based on a result of the querying.

19. The non-transitory computer-readable storage medium of claim 18 whose stored contents configure the computing system to perform the method, the method further comprising:

identifying a component of the target object that does not match a corresponding component of the selected object; and indicating in the message that the corresponding component of the selected object was removed, altered, or replaced between a first time when the digital fingerprint was generated or acquired and a second time, after the first time, when the target digital fingerprint was generated.

20. The non-transitory computer-readable storage medium of claim 18 wherein querying the database system, based on the target digital fingerprint, to authenticate the target object as the selected object, includes excluding the one of the plurality of components during authentication of the target object as the selected object.

\* \* \* \* \*